(12) United States Patent
Ikari

(10) Patent No.: US 9,025,206 B2
(45) Date of Patent: May 5, 2015

(54) PROCESSING IMAGE USING SHARED BUFFER

(71) Applicant: Canon Kabushiki Kaisha, Tokyo (JP)

(72) Inventor: Daiki Ikari, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/097,828

(22) Filed: Dec. 5, 2013

(65) Prior Publication Data

US 2014/0168710 A1  Jun. 19, 2014

(30) Foreign Application Priority Data

Dec. 14, 2012 (JP) ................................. 2012-273673

(51) Int. Cl.
| | | |
|---|---|---|
| H04N 1/00 | (2006.01) | |
| H04N 1/60 | (2006.01) | |
| H04N 1/405 | (2006.01) | |
| H04N 1/52 | (2006.01) | |
| H04N 1/409 | (2006.01) | |

(52) U.S. Cl.
CPC ............. H04N 1/6027 (2013.01); H04N 1/405 (2013.01); H04N 1/52 (2013.01); H04N 1/409 (2013.01)

(58) Field of Classification Search
USPC ......... 358/2.99, 3.27, 1.9, 530–533, 538, 2.1; 382/256–258
See application file for complete search history.

(56) References Cited

U.S. PATENT DOCUMENTS

| | | | |
|---|---|---|---|
| 5,801,843 A * | 9/1998 | Overton | 358/447 |
| 7,003,152 B1 | 2/2006 | Sawada | |
| 2006/0103857 A1* | 5/2006 | Janisch | 358/1.1 |
| 2011/0128560 A1 | 6/2011 | Fujimoto et al. | |
| 2011/0222127 A1* | 9/2011 | Loce et al. | 358/3.27 |

FOREIGN PATENT DOCUMENTS

| | | |
|---|---|---|
| JP | 2000-206756 A | 7/2000 |
| JP | 2011-131575 A | 7/2011 |

\* cited by examiner

*Primary Examiner* — Barbara Reinier
(74) *Attorney, Agent, or Firm* — Fitzpatrick, Cella, Harper & Scinto

(57) ABSTRACT

An image forming apparatus is provided that can provide a natural edge processing even if a toner save processing and a line width correction processing are configured in parallel. The image forming apparatus detects an edge neighboring region of an input image in a predetermined direction. The edge neighboring region detected by the neighboring edge detection step is subjected to a line width correction processing. An edge region of the input image in a direction other than the predetermined direction is detected. Then, a toner save processing is performed on a no-edge region that is a region other than the edge region detected by the edge detection step.

45 Claims, 26 Drawing Sheets

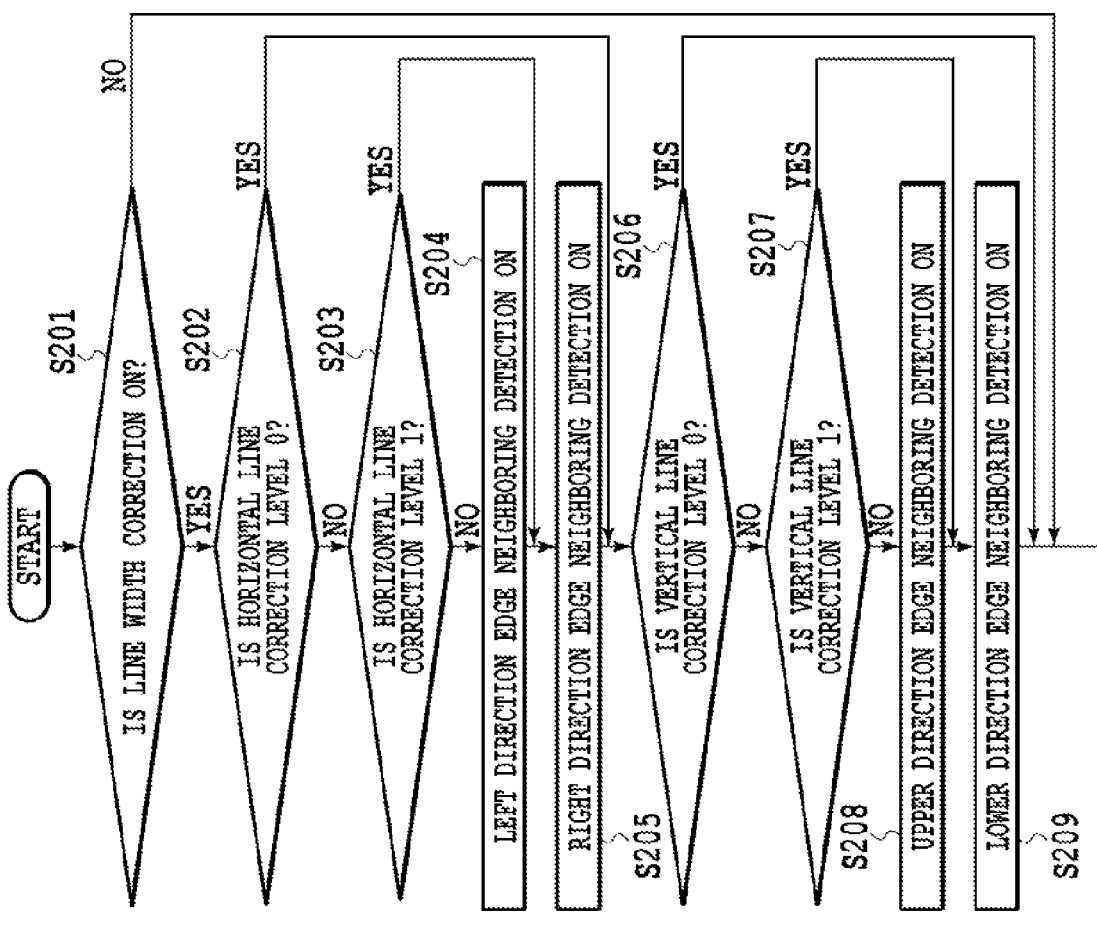

|  | HORIZONTAL LINE CORRECTION | LEVEL 0 | LEVEL 1 | LEVEL 2 |
|---|---|---|---|---|
| TONER SAVE PROCESSING | LEFT EDGE DETECTION SETTING | ON | ON | OFF |
|  | RIGHT EDGE DETECTION SETTING | ON | OFF | OFF |
| LINE WIDTH CORRECTION PROCESSING | LEFT EDGE NEIGHBORING DETECTION SETTING | OFF | OFF | ON |
|  | RIGHT EDGE NEIGHBORING DETECTION SETTING | OFF | ON | ON |

FIG.24A

|  | VERTICAL LINE CORRECTION | LEVEL 0 | LEVEL 1 | LEVEL 2 |
|---|---|---|---|---|
| TONER SAVE PROCESSING | UPPER EDGE DETECTION SETTING | ON | ON | OFF |
|  | LOWER EDGE DETECTION SETTING | ON | OFF | OFF |
| LINE WIDTH CORRECTION PROCESSING | UPPER EDGE NEIGHBORING DETECTION SETTING | OFF | OFF | ON |
|  | LOWER EDGE NEIGHBORING DETECTION SETTING | OFF | ON | ON |

FIG.24B

PROCESSING IMAGE USING SHARED BUFFER

BACKGROUND OF THE INVENTION

1. Field of the Invention

The present invention relates to an image forming apparatus and an image forming method by which a printing operation can be performed while saving a toner consumption amount than in a normal case.

2. Description of the Related Art

In recent years, an image forming apparatus has been developed that has, in addition to a normal print mode to form and print a high-quality image, a toner save mode to perform a printing operation while saving a toner consumption amount than in a normal case. Methods for saving a toner consumption amount than in a normal case include a density conversion, a pulse width modulation, and the logical product of a normal print image and a culling pattern. However, even any of the toner save mode methods is desired to maintain the quality (readability) of the characters of an image with minimized deterioration. In order to realize this, there is a technique to extract an edge (contour) region of an image object such as a character or a line so that a toner consumption amount for the edge region in a save mode is equal to that in a normal print mode and regions other than the edge region provide a reduced toner consumption amount. This consequently achieves both of the character readability and the toner consumption amount saving (Japanese Patent Laid-Open No. 2011-131575).

On the other hand, in order to improve the print quality of black characters and lines, there is a technique to detect an edge region of an image object such as a black character or a line to expand the detected edge region (line width correction processing) (Japanese Patent Laid-Open No. 2000-206756).

A technique for the toner saving and a technique for the line width correction both require the edge detection of characters and lines in order to maintain and improve the print quality.

However, in the case of the above-described line width correction processing, an inputted pixel, which originally corresponded to an edge, is converted by the line width correction processing to a shape that does not correspond to an edge anymore. In a case where the above-described two techniques are realized by a parallel configuration, an edge region detected for the toner save processing is converted by the parallelly-provided line width correction processing to a shape that does not correspond to an edge region anymore. Thus, a disadvantage is caused in which an unnatural edge processing deteriorates the print quality. Specifically, in the case of the parallel configuration in which the toner save processing unit and the line width correction processing unit are executed in parallel, two processing units receive, as an input, an image prior to being subjected to the respective processings. Thus, the line width correction processing plumps the edge region but an original edge region before plumping is not subjected to toner saving, thus resulting in an unnaturally-highlighted edge.

In the case of a sequential configuration in which the line width correction processing is followed by the toner save processing, the above-described unnatural edge processing can be avoided. However, the two processings cannot share a buffer for edge detection, thus disadvantageously causing an increased circuit size. Specifically, in the case of the sequential configuration, the buffer used by the respective image processings cannot be shared, thus requiring a plurality of buffers to be independently configured for the respective image processings.

SUMMARY OF THE INVENTION

An image forming apparatus, comprising: an edge neighboring detection unit configured to detect an edge neighboring region of an input image in a predetermined direction; a line width correction processing unit configured to perform a line width correction processing on the edge neighboring region detected by the neighboring edge detection unit; an edge detection unit configured to detect, in the input image, an edge region in a direction other than the predetermined direction; and a toner save processing unit configured to perform a toner save processing on a no-edge region that is a region other than the edge region detected by the edge detection unit.

According to the present invention, an unnaturally-highlighted edge can be suppressed even if the toner save processing and the line width correction processing are realized by a parallel configuration by which a buffer can be shared (a configuration by which a shared circuit provides a size-reduced circuit).

Further features of the present invention will become apparent from the following description of exemplary embodiments (with reference to the attached drawings).

BRIEF DESCRIPTION OF THE DRAWINGS

FIGS. 14A to 14E illustrate an example of the edge neighboring determination processing in the line width correction processing unit;

FIG. 22 is a diagram showing a relationship between FIGS. 22A and 22B;

FIGS. 22A and 22B illustrate an example of the operation flowchart related to the line width correction and the toner save processing setting;

FIGS. 24A and 24B illustrate an example of the setting result of the line width correction/toner save processing setting.

DESCRIPTION OF THE EMBODIMENTS

The following section will describe the best mode for carrying out the present invention with reference to the drawings.

[Illustrative Embodiment 1]

<Appearance of Copier>

Figure 1:
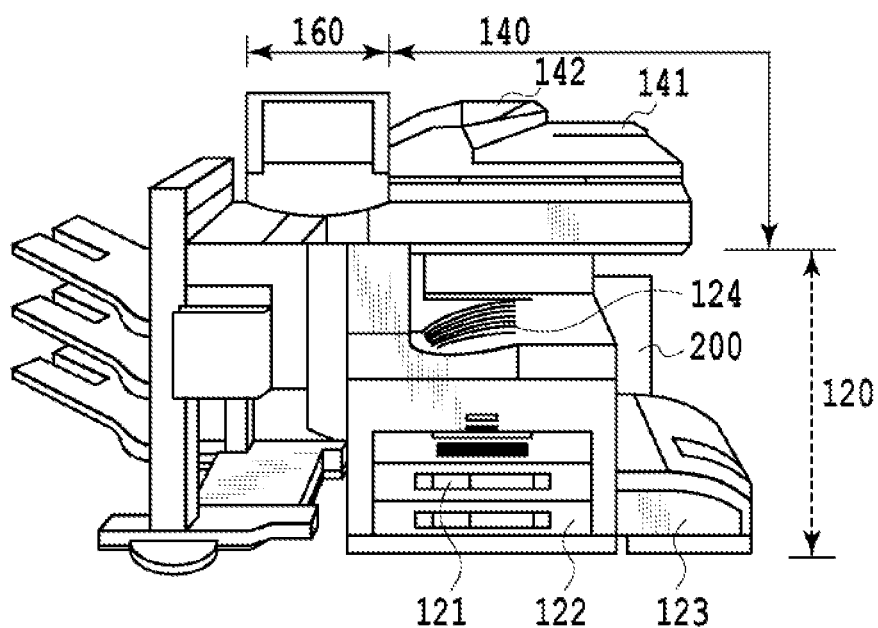
FIG. 1 illustrates an example of the appearance of a copier.

FIG. 1 illustrates an example of the appearance of a copier in Illustrative Embodiment 1.

A scanner unit 140, which is an image reading unit, is configured to input, to a linear image sensor (CCD sensor), the reflected light obtained by subjecting an image on a paper to exposure scanning by light emission from a illumination lamp to thereby convert the image information to an electric signal. The scanner unit 140 further converts the electric signal to a brightness signal consisting of the respective colors of R, G, and B to output the brightness signal as image data to a controller 200 (which will be described later).

The paper is set on the tray 142 of the paper feeder 141. In a case where a user uses the operation unit 160 to instruct the start of a reading operation, then the controller 200 sends a paper reading instruction to the scanner unit 140. Upon receiving the instruction, the scanner unit 140 feeds papers from the tray 142 of the paper feeder 141 one by one to perform a paper reading operation. The paper placed on the glass of a paper stand (not shown) also may be read.

The printer unit 120 is an image forming device that forms image data received from the controller 200 on a paper as a print medium.

The image forming method in this embodiment is an electronic photograph method using a photoreceptor drum or a photoreceptor belt. The printer unit 120 includes a plurality of paper cassettes 121, 122, and 123 that can handle different paper sizes or different paper directions. A discharge tray 124 receives a discharged printed paper.

<Copier Controller>

Figure 2:
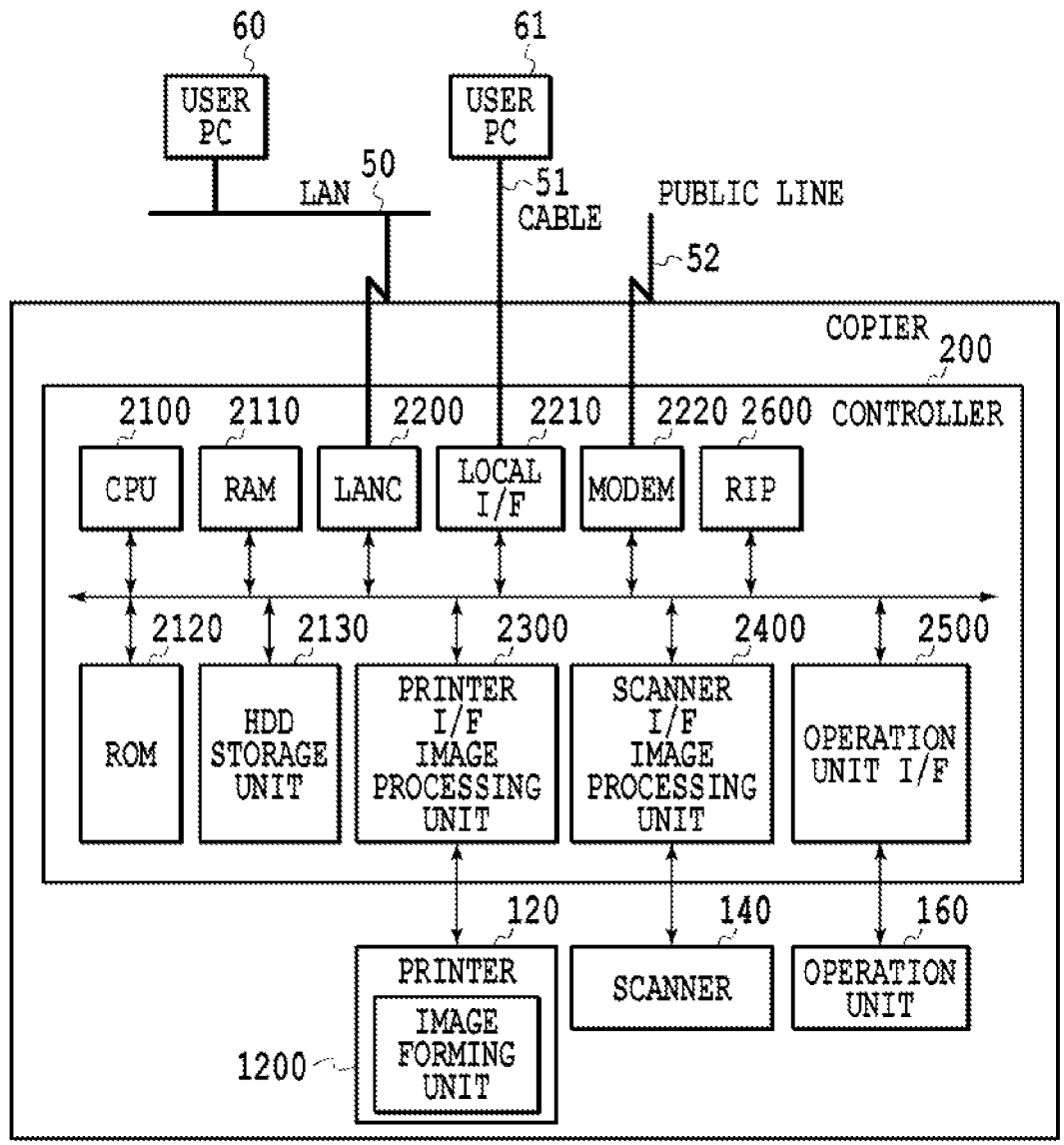
FIG. 2 is a block diagram illustrating an example of the configuration of a controller.

FIG. 2 is a block diagram illustrating the hardware configuration of a copier of the present invention (in particular, an example of the detailed configuration of the controller 200).

The controller 200 is connected to the scanner unit 140 as an image input device, the printer unit 120 as an image output device, the LAN 50, and the public line (WAN) 52 and controls, in an integrated manner, the operation of the copier and controls the input/output of the image information or device information.

A CPU 2100 is a processor that controls the entire copier and controls, based on a control program stored in the ROM 2120 for example, the access to various connected device in an integrated manner. Furthermore, the CPU 2100 controls various processings performed in the controller 200 in an integrated manner. The RAM 2110 is a system work memory and also functions as an image memory for temporarily storing image data for example. The ROM 2120 is a boot ROM that stores therein a system boot program. A HDD storage unit 2130 is a hard disk that mainly stores therein information (system software) required to start and operate the computer and image data. These pieces of data are not limited to the HDD storage unit 2130 and also may be stored in such a recording medium that can hold the memory even when the power source is OFF.

The LANC (LAN controller) 2200 is connected to a LAN 50 and performs an input/output operation with the user PC 60 of the output image data and information related to the device control. A local IF (local interface) 2210 is an interface such as an USB or Centronics that is connected via a cable 51 to the user PC 61 or the printer to perform a data input/output operation. The MODEM 2220 is connected to the public line 52 and performs a data input/output operation.

The RIP (raster image processor) 2600 develops, into bitmap data, image data (PDL (page description language) code) received from the user PC 60 via the LAN 50.

The scanner IF image processing unit 2400 is connected to the scanner unit 140 and communicates with the CPU provided in the scanner unit 140. The scanner IF image processing unit 2400 also receives image read by the image reading unit of the scanner unit 140 to use a known technique to execute various image processings such as a shading correction.

The operation unit IF 2500 is an interface that outputs the image data to be displayed on the operation unit 160 from the controller 200 to the operation unit 160 and that outputs, to the controller 200, information inputted from the user of the copier through the operation unit 160.

The printer IF image processing unit 2300 is connected to the printer unit 120 and communicates with the CPU provided in the printer unit 120. The printer IF image processing unit 2300 performs an image processing such as the toner save processing of the image data and a line width correction processing (will be described later). Although the details will not be described, the printer unit 120 is configured so that the image forming unit 1200 forms an image on a print medium such as a print paper.

<Printer Unit of Copier>

Figure 3:
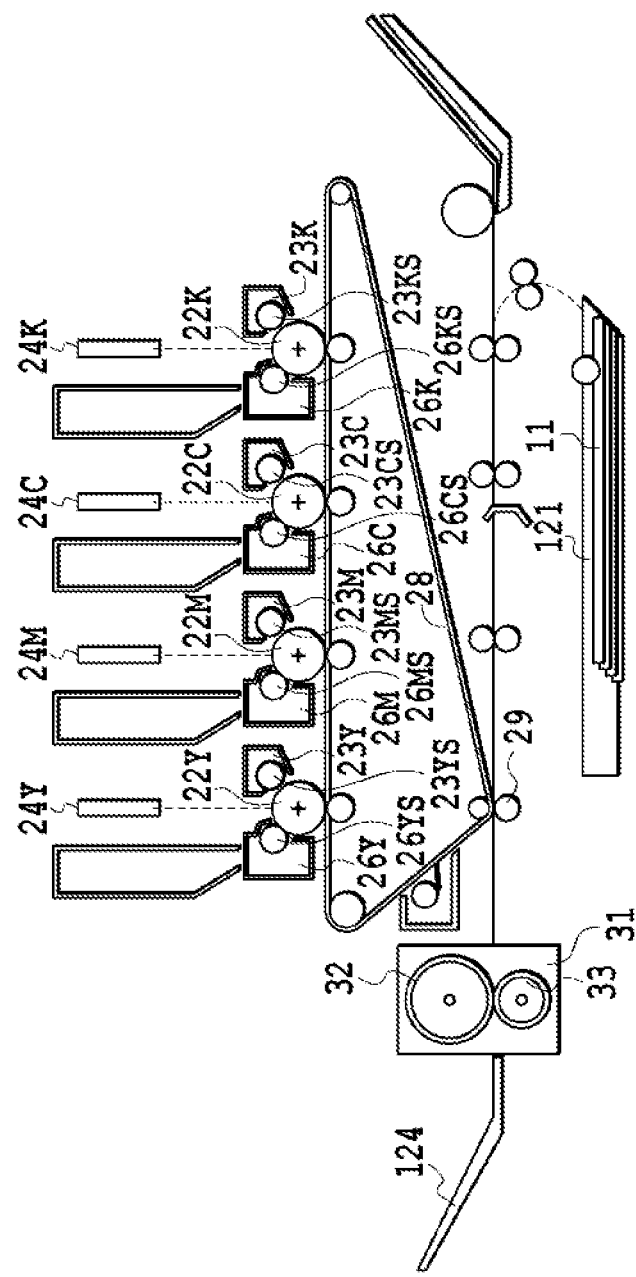
FIG. 3 is a schematic view illustrating an example of the structure of an image forming unit.

FIG. 3 illustrates an example of the image forming unit 1200 of the printer unit 120 of the copier of the electronic photograph method of this embodiment. FIG. 3 is a cross-sectional diagram illustrating a tandem copier using an intermediate transfer body 28. With reference to FIG. 3, the following section will describe the operation of the image forming unit 1200 in the printer unit 120.

The image forming unit 1200 drives the exposure depending on a desired exposure time to form an electrostatic latent image to develop this electrostatic latent image to thereby form an image of a single color toner. A plurality of images of the single color toner are superposed to form a multi-color toner image. This multi-color toner image is transferred to the print medium 11 to thereby fix the multi-color toner image on the print medium 11.

An electrostatic charge unit is configured to include four injection electrostatic charge units 23Y, 23M, 23C, and 23K to electrostatically charge photoreceptors 22Y, 22M, 22C, and 22K for the respective colors of Y, M, C, and K. The respective injection electrostatic charge units include sleeves 23YS, 23MS, 23CS, and 23KS.

The photoreceptors 22Y, 22M, 22C, and 22K are rotated by receiving the driving force sent from a driving motor (not shown). The driving motor causes the photoreceptors 22Y, 22M, 22C, and 22K to rotate in the counter-clockwise direction depending on the image forming operation. The exposure unit is configured to allow, based on the image data of the plurality of colors (Y, M, C, and K), the photoreceptors 22Y, 22M, 22C, and 22K to be irradiated by the exposure from the scanner units 24Y, 24M, 24C, and 24K to selectively expose the surfaces of the photoreceptors 22Y, 22M, 22C, and 22K. As a result, an electrostatic latent image is formed.

A development unit is configured, in order to visualize the electrostatic latent image, to include four development units 26Y, 26M, 26C, and 26K for developing the respective colors of Y, M, C, and K. The respective development units have sleeves 26YS, 26MS, 26CS, and 26KS. Specifically, the development unit is a unit that develops the electrostatic latent image formed on the photoreceptor to form a single color toner image on the photoreceptor.

A transfer unit is a unit to transfer the single color toner image from the photoreceptor 22 to the intermediate transfer body 28. Specifically, the transfer unit is a unit that sequentially transfers images of a plurality of colors developed by the respective development units onto a medium such as an intermediate transfer body.

Furthermore, the transfer unit superposes, for each station, single color toner images onto the intermediate transfer body 28 to convey the superposed multi-color toner image by the rotation of the intermediate transfer body 28 to the second transfer roller 29. Furthermore, the print medium 11 is conveyed from the paper cassette 121 to the second transfer roller 29 in a sandwiched manner. Then, the multi-color toner image on the intermediate transfer body 28 is transferred onto the print medium 11. This second transfer roller 29 is applied with an appropriate bias voltage. Then, the toner image is electrostatically transferred to the print medium 11.

In order to melt and fix the multi-color toner image transferred to the print medium 11 to the print medium 11, the fixing apparatus 31 includes a fixing roller 32 for heating the print medium 11 and a pressurization roller 33 for causing the print medium 11 to be abutted to the fixing roller 32 in a pressurized manner. The fixing apparatus 31 conveys the print medium 11 having thereon the multi-color toner image via the fixing roller 32 and the pressurization roller 33 and applies heat and a pressure thereto to thereby fix the toner to the print medium 11.

Then, the print medium 11 after the toner fixing is discharged by a discharge roller (not shown) into the discharge tray 124, thereby completing the image forming operation.

<Copier Operation Unit>

Figure 4:
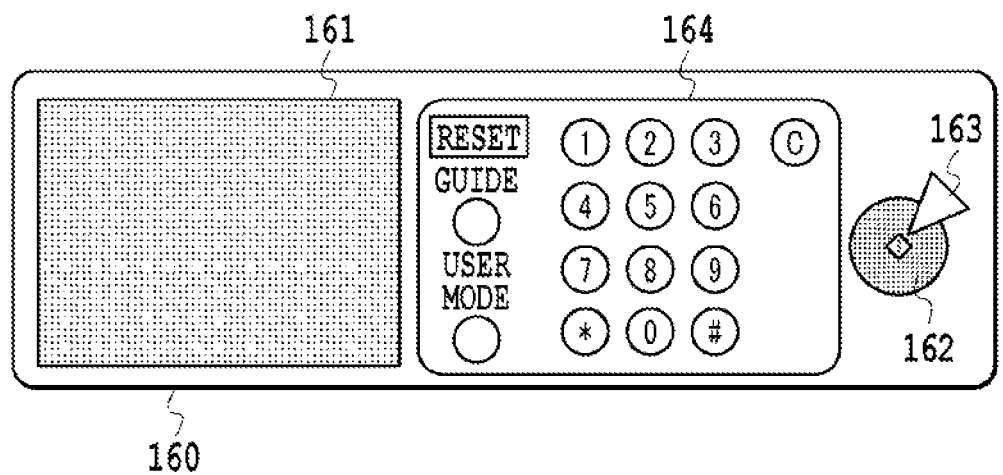
FIG. 4 illustrates an example of the configuration of an operation unit.

FIG. 4 illustrates an example of the configuration of the operation unit 160.

The liquid crystal operation panel 161 is obtained by combining liquid crystal with a touch panel. The liquid crystal operation panel 161 displays the operation screen. In a case where a display key is depressed by a user, the information is sent to the controller 200. A start key 162 is used to start the operation to read and print a paper image or to send an instruction to start other functions. The start key includes LEDS of two colors of green and red. In a case where the lighting of green light shows that the operation can be started while the lighting of red light shows that the operation cannot be started. The stop key 163 has a function to stop the operation being performed. The hard key group 164 includes a ten key, a clear key, a reset key, a guide key, and a user mode key.

<Printer IF Image Processing Unit>

Figure 5:
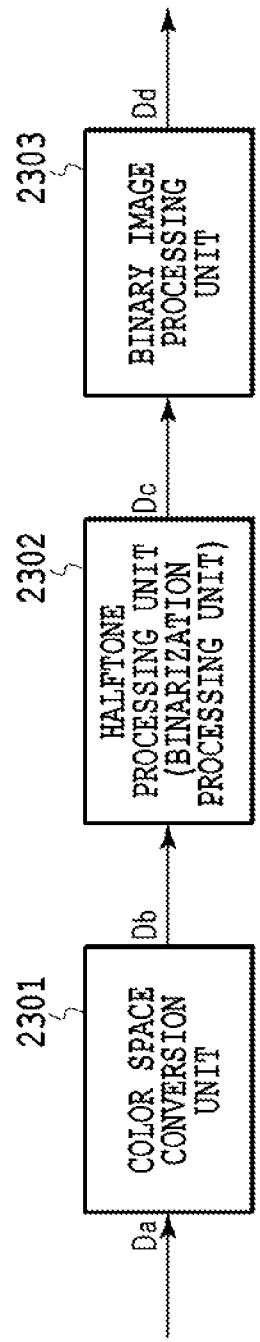
FIG. 5 illustrates an example of the configuration of a printer IF image processing unit.

FIG. 5 is a block diagram illustrating an example of the configuration of the printer IF image processing unit 2300. The printer IF image processing unit 2300 generates, from the pixel data of the bitmap data developed by the RIP 2600, such pixel data that is used for the subsequent image forming by the image forming unit 1200.

A color space conversion unit 2301 first receives the pixel data Da of the bitmap data developed by the RIP 2600. The color space conversion unit 2301 handles not only the pixel data received from the user PC 60 for example but also pixel data from the image reading unit of the scanner unit 140 and pixel data received via FAX through a public line 52. Then, the color space conversion unit 2301 converts, based on the toner color of the subsequent image forming unit 120, the inputted RGB pixel data to CMYK pixel data using a known technique. The color-converted pixel data Db is outputted to a subsequent unit.

Thereafter, the halftone processing unit 2302 performs a halftone processing on the pixel data Db of the respective CMYK colors. The halftone processing is a processing to reduce the gradation number of inputted pixel data. Generally, the image forming unit 1200 can receive low gradation data such as 2, 4, or 16 gradations. Thus, even in the image forming unit 1200 that can reproduce a small number of gradations, the gradation number is reduced by the halftone processing unit 2302 so that a stable half tone can be represented. A specific configuration of the halftone processing unit includes the one using a screen processing or the one using an error diffusion processing. The screen processing is a processing to use a plurality of predetermined dither matrices and inputted pixel data to obtain an N value (N is a natural number). The error diffusion processing is a processing to compare input pixel data with a predetermined threshold value to obtain the N value to diffuse the difference between the input pixel data and the threshold value to surrounding pixels to be subjected to the N value processing. In this embodiment, it is assumed that, in the following description for the subsequent processing, the pixel data Dc outputted from the halftone processing unit 2302 is handled by the halftone processing as binarized pixel data.

The binary image processing unit 2303 receives the binarized pixel data Dc to execute various image processings. As a result, a desired image for a user or a high-quality image can be obtained. The details of the image processing will be described later. Finally, the binary image processing unit 2303 outputs the pixel data Dd that is N-valued (or binarized in this embodiment) and image-processed for the image forming by the image forming unit 1200 described in FIG. 3.

<Binary Image Processing Unit>

Figure 6:
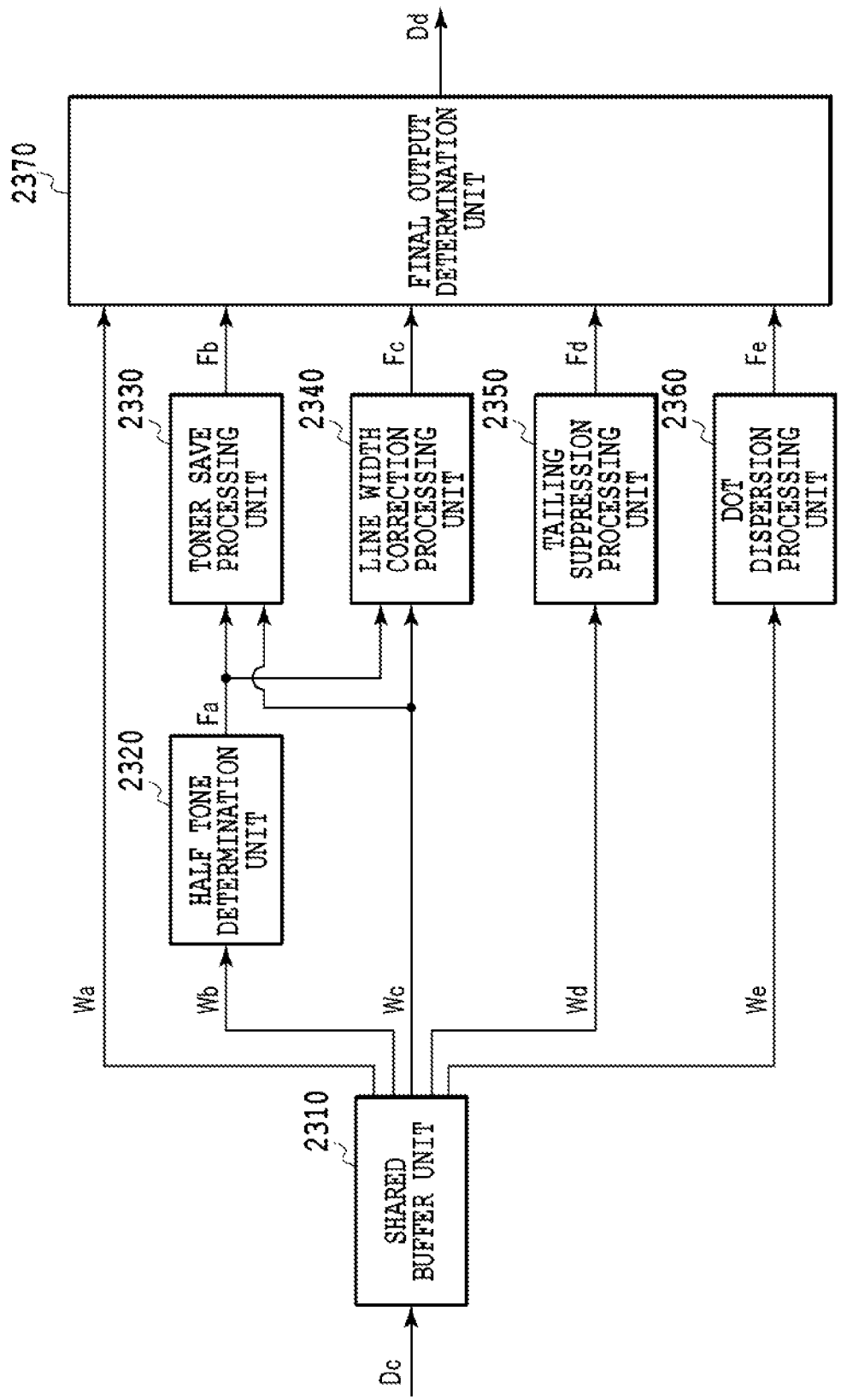
FIG. 6 illustrates an example of the configuration of a binary image processing unit.

Next, the following section will describe the interior of the binary image processing unit 2303 with reference to FIG. 6. The following description will be made based on an assumption that, with regard to the pixel data binarized by the above-described halftone processing unit, 1 represents a black pixel and 0 represents a white pixel. The binary image processing unit 2303 performs the respective processing on the respective pixels in parallel to obtain the respective processing results. Then, based on the respective processing results, the output pixel value of the pixel is finally determined. Hereinafter, a pixel being processed by the binary image processing unit 2303 will be called as a target pixel and the position thereof will be called as a target pixel position.

As shown in FIG. 6, the binary image processing unit 2303 includes the shared buffer unit 2310, the half tone determination unit 2320, the toner save processing unit 2330, the line width correction processing unit 2340, the tailing suppression processing unit 2350, the dot dispersion processing unit 2360, and the final output determination unit 2370.

The shared buffer unit 2310 is provided at the former stage of each image processing unit and retains, in an accumulated manner, the input pixel data corresponding to a plurality of lines. Based on the retained and accumulated input pixel data, the shared buffer unit 2310 collectively outputs the pixel groups (pixel groups for a common region) required for the subsequent image processing unit, respectively.

The half tone determination unit 2320 refers to the pixel group Wb having a predetermined window size (e.g., 11×11) having a target pixel as a center to determine whether the target pixel is a pixel of the half tone region or not. The half tone determination result Fa is outputted to the subsequent toner save processing unit 2330 and line width correction processing unit 2340. As will be described later, in a case where the target pixel is not a pixel of a half tone region and is an edge pixel, then no toner save processing is performed. In a case where the target pixel is a pixel of a half tone region, no line width correction processing is performed.

The toner save processing unit 2330 mainly performs, on an image object (simply will be referred to as an object), a pixel culling processing for reducing the toner consumption amount. The toner save processing unit 2330 determines, based on the culling pattern of the toner save processing and the target pixel position, whether or not the target pixel is a culling target. The toner save processing unit 2330 refers to the pixel group We having a predetermined window size (e.g., 3×3) having a target pixel as a center to determine whether or not the target pixel is an edge pixel positioned at a neighboring boundary between a black pixel and a white pixel. In a case where the target pixel is a culling target and the input pixel value is 1 (black pixel) is not determined as an edge pixel, the determination result Fb is set to ON (execution of the culling for toner saving). Then, the pixel value is converted to 0 (white pixel) and outputted. In a case where the target pixel is the culling target and the input pixel value is 1 (black pixel), then the target pixel is determined as an edge pixel. In a case where the half tone determination result Fa shows that the pixel is the one of a half tone region, then the determination result Fb is set to ON with regard to the pixel. Then, the pixel value is converted to 0 and the convert value is outputted. This consequently reduces the toner consumption amount while suppressing a situation where the quality of an edge is deteriorated because an edge of an object of a region other than a half tone region (e.g., character) is undesirably culled.

The line width correction processing unit 2340 mainly performs a line width correction processing to cause a fine line or an object such as a small graphic to be conspicuous. The line width correction processing may be called as a plump processing. The line width correction processing unit 2340 refers to a pixel group We having a predetermined window size (e.g., 3×3) having a target pixel as a center to determine whether or not the target pixel is an edge neighboring pixel. In a case where the target pixel is determined as an edge neighboring pixel and the half tone determination result Fa shows that the target pixel is not the one of a half tone region and the inputted pixel value is 0 (white pixel), then the determination result Fc for the target pixel sets the line width correction processing execution to ON and the pixel value is converted to 1 (black pixel) and the converted value is outputted. This consequently improves the quality of a fine line or an object such as a small graphic while suppressing the deteriorated quality of the edge due to the highlighted edge of a halftone dot of the half tone region.

The tailing suppression processing unit 2350 performs a culling for tailing suppression. The tailing suppression processing unit 2350 refers to the pixel group Wd having a predetermined window size (e.g., 5×9) having a target pixel as a center to determine whether the culling processing for the tailing suppression is required or not. Specifically, in a case where the pixel group Wd matches a specific pattern pixel group, the tailing suppression processing unit 2350 determines that the culling processing for the tailing suppression is required. The tailing suppression processing unit 2350 also determines, based on the culling pattern for the tailing suppression processing and the target pixel position, whether or not the target pixel is a culling target. In a case where it is determined that the culling processing for the tailing suppression is required and the target pixel is a culling target, then the determination result Fd for the target pixel sets the execution of culling for tailing suppression to ON and the input pixel value is converted to 0 (white pixel) and the converted value is outputted.

The dot dispersion processing unit 2360 is configured, in order to prevent an image having an unattractive appearance, to perform a processing to reduce the size of white dots having a specific pattern in the image while maintaining the density to disperse the dots. The dot dispersion processing unit 2360 refers to the pixel group We having the predetermined window size (e.g., 27×27) having a target pixel as a center to determine whether or not the white dot of the current target pixel is size-reduced and white dots are given to the target pixel position. Then, the determination result Fe is outputted. In a case where it is determined that the white dots should be size-reduced, then the input pixel value of the target pixel is converted to 1 (black pixel) and the converted value is outputted. In a case where it is determined that white dots should be given to the target pixel, then the input pixel value of the target pixel is converted to 0 (white pixel) and the converted value is outputted. In a case where neither of the above determinations is made, then the input pixel value of the target pixel is directly outputted.

The final output determination unit 2370 determines the final pixel value of the target pixel based on the input pixel value of the target pixel and the processing results of the respective processing units.

<Shared Buffer Unit>

Next, with reference to FIGS. 7A and 7B, the shared buffer unit 2310 will be described in detail. First, the binarized pixel data Dc is inputted to the shared buffer unit 2310. The shared buffer unit 2310 sequentially accumulates the pixel data Dc. As a result, the shared buffer unit 2310 accumulates the pixel data corresponding to a plurality of lines.

Figure 7B:
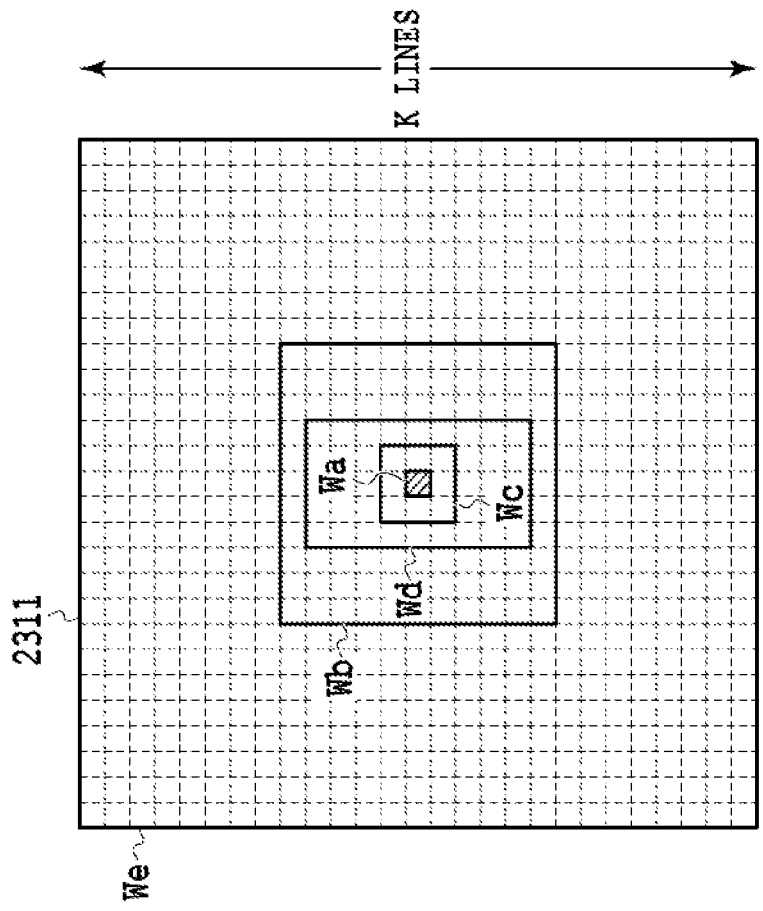
FIGS. 7A and 7B illustrate an example of the data accumulation and the output pixel group in a shared buffer unit.
Figure 7A:
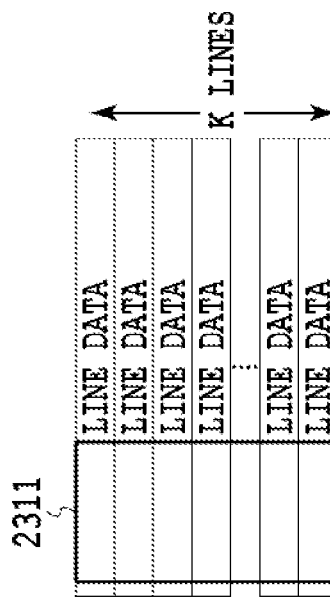

FIG. 7A illustrates pixel data corresponding to K lines accumulated in the shared buffer unit 2310. In a case where the accumulated pixel data reaches K lines, the shared buffer unit 2310 overwrites the pixels in a ring-like manner from the top in an accumulated manner. As a result, the shared buffer unit 2310 always retains the accumulated pixel data corresponding to the K lines starting from the line having the currently-accumulated input pixel data Dc. From this accumulated and retained pixel data group, the shared buffer unit 2310 collectively outputs the pixel data group required for the respective subsequent image processing unit. Thus, the accumulation amount (accumulated line number K) in the shared buffer unit 2310 matches the line width of the pixel group that is desired to be collectively referred to by the subsequent image processing unit.

FIG. 7B illustrates an example of the output pixel of the shared buffer unit 2310. The output pixel group 2311 illustrates a part of the data corresponding to K lines shown in FIG. 7A.

The pixel Wa is a target pixel and is directly inputted to the subsequent final output determination unit 2370.

The pixel group Wb is a pixel group outputted to the subsequent half tone determination unit 2320. The pixel group Wb is exemplarily shown as a 11×11 pixel group. Specifically, the half tone determination unit 2320 collectively refers to the 11×11 pixel group for the half tone determination of the target pixel position.

The pixel group Wc is a pixel group outputted to the subsequent toner save processing unit 2330 and line width correction processing unit 2340. The pixel group Wc is exemplarily shown as a 3×3 pixel group. Specifically, the toner save processing unit 2330 and the line width correction processing unit 2340 collectively refer to the 3×3 pixel group in order to obtain the toner save processing result for the target pixel position and the line width correction processing result.

The pixel group Wd is a pixel group outputted to the subsequent tailing suppression processing unit 2350. The pixel group Wd is exemplarily shown as a 5×9 pixel group. Specifically, the tailing suppression processing unit 2350 collectively refers to the 5×9 pixel group in order to obtain the tailing suppression processing result of the target pixel position.

The pixel group We is a pixel group outputted to the subsequent dot dispersion processing unit 2360. The pixel group We is exemplarily shown as a 27×27 pixel group. Specifically, the dot dispersion processing unit 2360 collectively refers to the 27×27 pixel group in order to obtain the dot dispersion processing result of the target pixel position.

Thus, 27, which is the maximum line number among the output pixel group from Wa to We, is the line number to be accumulated in the shared buffer unit 2310. Thus, K=27 is established in this embodiment.

By having the shared buffer unit 2310 as described above, no need is required to individually configure a plurality of buffer units to generate the pixel groups Wa, Wb, Wc, Wd, and We. Thus, the existence of the shared buffer unit 2310 as in this embodiment can achieve a smaller circuit size and a lower cost when compared with a case where a plurality of buffer units are configured.

<Half Tone Determination Processing>

Figure 8:
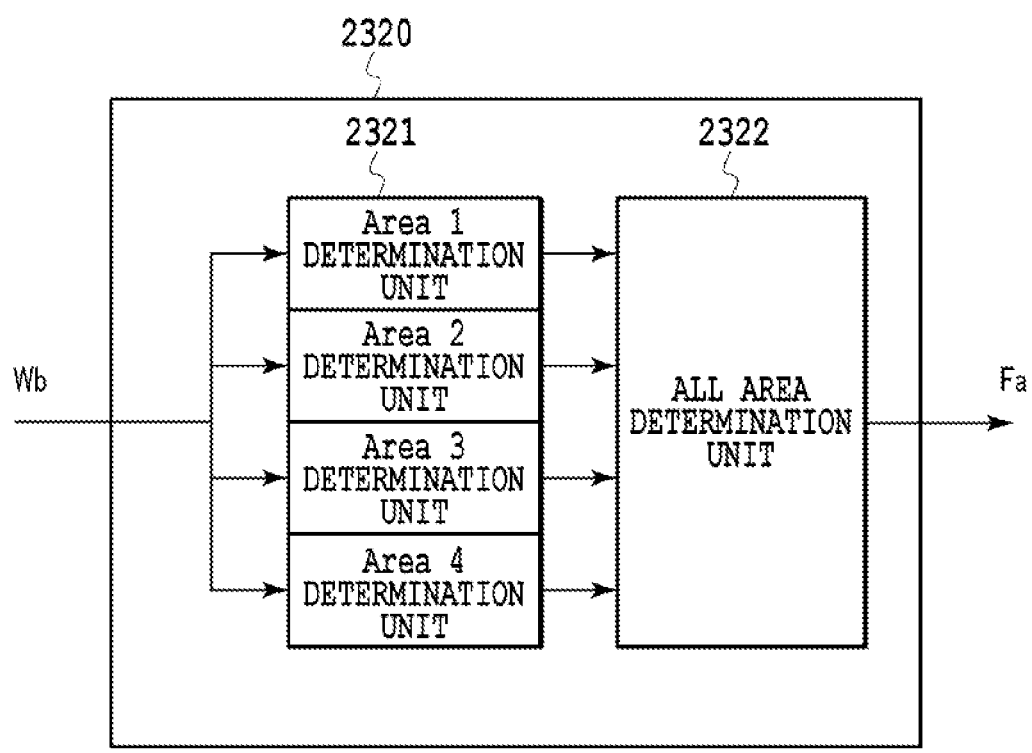
FIG. 8 is a block diagram illustrating an example of the configuration of a half tone determination unit.

Next, with reference to FIG. 8, the half tone determination unit 2320 will be described in detail. The half tone determination unit 2320 receives the 11×11 pixel group Wb from the shared buffer unit 2310. In the half tone determination unit 2320, firstly, the pixel group Wb is inputted to four Area* determination units 2321 (* shows the numbers from 1 to 4). The Area* determination unit 2321 determines whether a specific area is entirely-white or not.

Figure 9A:
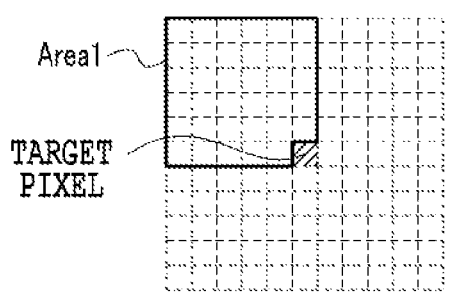
FIGS. 9A to 9D illustrate an example of the Area determination in the half tone determination unit.
Figure 9B:
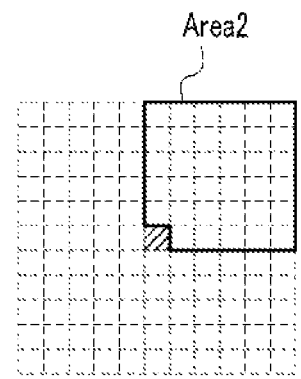
Figure 9C:
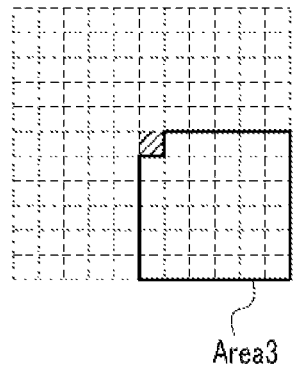
Figure 9D:
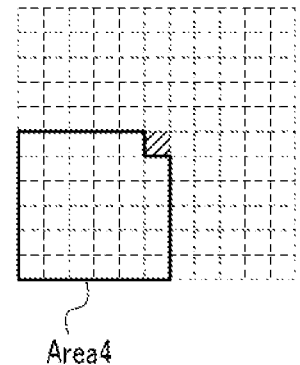

FIGS. 9A to 9D illustrate the processing by the Area* determination unit 2321. The respective 11×11 matrices shown in FIGS. 9A to 9D represent the pixel group Wb. The shaded parts show the target pixel. In FIG. 9A, the Area1 thereamong is shown by a thick line. Similarly, the Area1 in FIG. 9B, the Area3 in FIG. 9C, and the Area4 in FIG. 9D are shown by a thick line. The Area* determination unit 2321 determines whether these areas are respectively entirely white or not. An area that is entirely white means that all pixels in the area have a value of 0.

Then, an all area determination unit 2322 generates a final half tone determination result Fa based on the determination by the area* determination unit 2321 that the four areas are entirely white. Specifically, if anyone of the four areas is determined to be entirely white, then a half tone is not determined. If no one of the four areas is determined to be entirely white, then a half tone is determined. If it is determined that the respective four areas are entirely black (all pixel values have a value of 1), a half tone is similarly determined in this embodiment. Specifically, the half tone of this embodiment does not necessarily match the half tone of the area gradation.

In this embodiment, the one half tone determination result Fa outputted from the half tone determination unit 2320 is commonly inputted to the subsequent toner save processing unit 2330 and line width correction processing unit 2340. In this manner, the half tone determination result shared by the toner save processing and the line width correction processing can reduce the circuit size. However, the invention is not limited to such a configuration. Another configuration also may be used in which the toner save processing unit 2330 and the line width correction processing unit 2340 may respectively change the definitions of the determinations areas 1 to 4. Then, the respective determination results may be separately inputted to the toner save processing unit 2330 and the line width correction processing unit 2340.

<Toner Save Processing>

Figure 10:
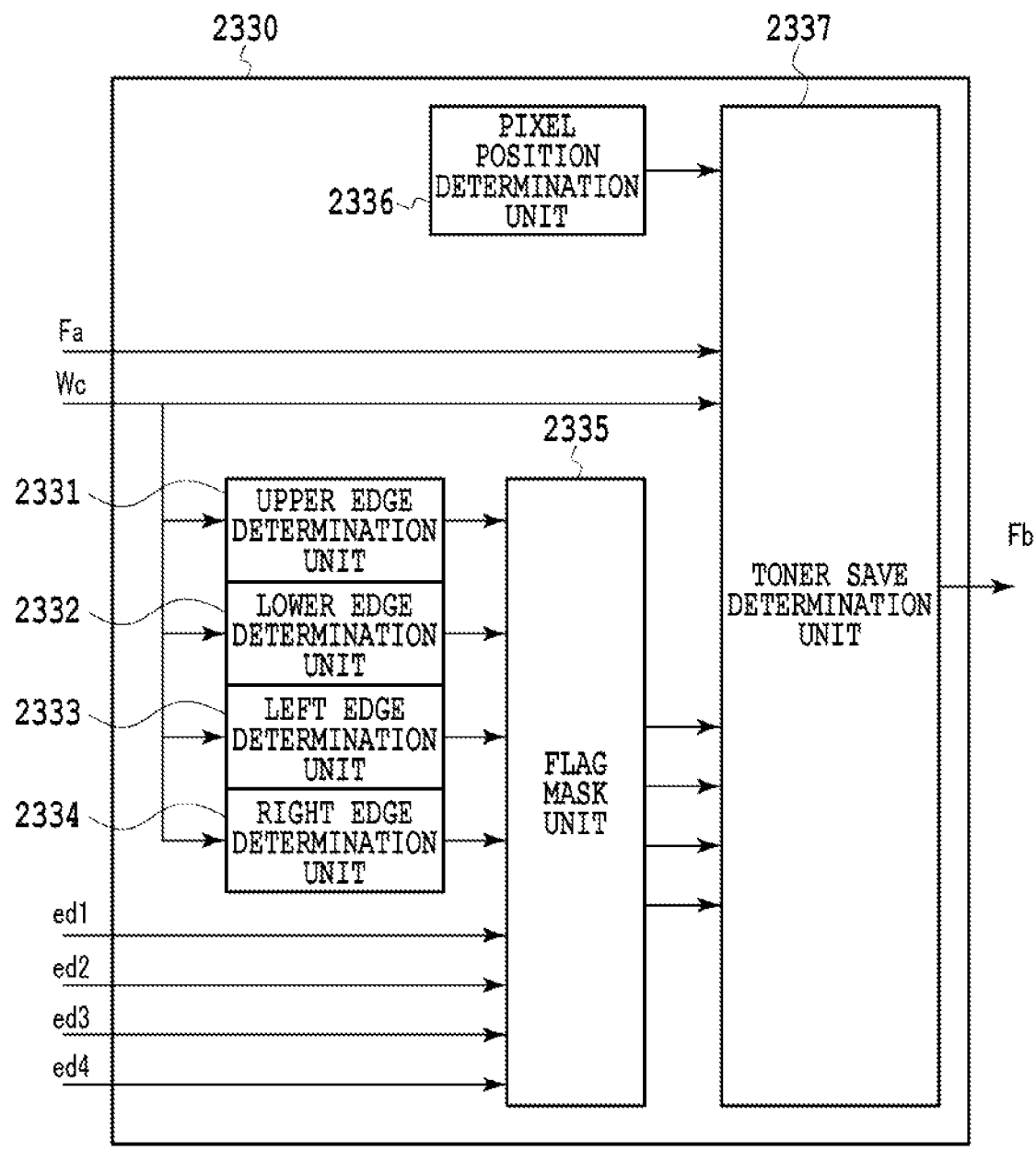
FIG. 10 illustrates an example of the configuration of a toner save processing unit.

Next, with reference to FIG. 10, the toner save processing unit 2330 will be described in detail. The toner save processing unit mainly performs the pixel culling processing to reduce the toner consumption amount. The toner save processing unit 2330 receives the 3×3 pixel group Wc having a target pixel as a center from the shared buffer unit 2310. In the toner save processing unit 2330, firstly, the pixel group Wc is inputted to four edge determination units 2331 to 2334. The four edge determination units 2331 to 2334 execute the edge determination processing in four directions. The edge determination processing is a processing to determine whether the target pixel is an edge pixel provided at a neighboring boundary between a black pixel and a white pixel.

Figures 11A, 11B, 11C, 11D, 11E:
FIGS. 11A to 11E illustrate an example of the edge determination processing in the toner save processing unit.

FIGS. 11A to 11E illustrate the processings by the edge determination units 2331 to 2334. In FIG. 11A, the 3×3 matrix shows the pixel group Wc inputted to the edge determination units 2331 to 2334. The shaded part shows a target pixel. FIG. 11B shows the target pixel therein and a pixel for the upper region thereof. It is determined whether or not the target pixel in the pixel group Wc in FIG. 11A is a black pixel and the upper region pixel is a white pixel. This determination is executed by an upper edge determination unit 2331. In a case where the target pixel is a black pixel and the upper region pixel is a white pixel, the upper edge determination unit 2331 determines that the target pixel is an upper edge pixel to output the determination result the subsequent the flag mask unit 2335. Similarly, FIG. 11C shows target pixel and the pixel for the lower region thereof. FIG. 11D shows the target pixel and a pixel for the left region thereof. FIG. 11E shows the target pixel and a pixel for the right region thereof. These pixels are referred to respectively to perform an edge determination. The edge determination with regard to the lower direction, the left direction, and the right direction is executed by a lower edge determination unit 2332, a left edge determination unit 2333, and a right edge determination unit 2334 to determine whether or not the target pixel is a black pixel and the reference region pixel is a white pixel.

Next, the flag mask unit 2335 performs a processing to mask the edge determination result of the above-described upper, lower, left and right directions. By the mask processing, even if an edge is detected, the determination result showing that no edge is detected can be outputted to the subsequent unit. In this embodiment, among the edge determination results in the upper, lower, left, and right directions, an edge determination regarding the neighboring edge detection direction of the line width correction processing is masked. The masked determination result is outputted to the toner save determination unit 2337. As a result, only a plump edge in the edge is subjected to the toner save processing, thereby realizing a natural edge processing.

Specifically, the flag mask unit 2335 refers to the edge detection setting signals ed1 to ed4 inputted from the CPU 2100 by the setting described below to determine whether or not to mask the respective edge determination results. The reference marks ed1 to ed4 show the upper, lower, left and right edge detection settings, respectively. In a case where ed1 is set to OFF for example, the flag mask unit 2335 masks the edge determination signal outputted from the upper edge determination unit 2331 to send the determination result to a subsequent unit. Specifically, even if the upper edge determination unit 2331 detects an upper edge, the determination result showing that no upper edge is detected is sent to a subsequent unit. On the contrary, in a case where ed1 is set to ON and the upper edge determination unit 2331 detects an upper edge, then the determination result is directly outputted to a subsequent unit. A similar processing is performed on the lower edge for ed2, on the left edge for ed3, and on the right edge for ed4. By doing this, the flag mask unit 2335 outputs, to the subsequent toner save determination unit 2337, the edge determination result (edge detection information) in the direction along which ed1 to ed4 are ON.

The pixel position determination unit 2336 generates a signal showing the position of the currently-processed target pixel to output the signal to the toner save determination unit 2337. For example, in a case where a culling pattern is a checkered pattern, this output signal is a signal showing whether the target pixel is positioned at an odd number line or an even number line in the sub scanning direction within the processing page or is positioned at an odd number pixel or an even number pixel in the main scanning direction. This signal is used for the subsequent toner save determination processing.

Next, the toner save determination unit 2337 determines whether the current target pixel should be culled for the purpose of reducing the toner consumption amount (or a black pixel should be substituted with a white pixel). Then, the toner save determination unit 2337 outputs the determination result Fb to a subsequent unit. This determination is executed by referring to the half tone determination result Fa, the target pixel data showing a part of the 3×3 pixel group Wc, the upper, lower, left and right edge determination results outputted from the flag mask unit 2335, and the target pixel position information from the pixel position determination unit 2336.

The toner save determination unit 2337 first determines, by a logical operation, whether or not the target pixel is a culling target of a toner save processing based on the target pixel position information from the pixel position determination unit 2336 and the culling pattern for the toner save processing (a toner save pattern). As an example, the toner save determination unit 2337 refers to the target pixel position information to determine, in a case where the target pixel position is at an odd number line, the odd number pixel as a culling target and determines, in a case where the target pixel position is at an even number line, the even number pixel as a culling target. As a result, the pixels determined as a culling target are arranged to form a checkered pattern with regard to the entire image. In a case where a target pixel is not determined as a culling target, then the determination result Fb is set to OFF (a culling for toner saving is not executed) and thus the inputted target pixel value is directly outputted.

Next, in a case where the pixel is determined as a culling target, then whether or not the pixel is in an edge region is determined. The toner save determination unit 2337 refers to the masked upper, lower, left and right edge determination results inputted from the flag mask unit 2335 to determine whether the target pixel is in an edge region or not. For example, in a case where any one of the masked upper, lower, left and right edge determination results shows that the target pixel is in an edge region, then the target pixel is determined as an edge region. In a case where any one of the masked upper, lower, left and right edge determination results shows that the target pixel is in not an edge region, then the target pixel is determined as a no-edge region other than an edge region. In a case where the pixel determined as a culling target and determined as the one in a no-edge region has an input pixel value of 1 (black pixel), then the determination result Fb is set to ON (culling execution for toner saving) and the input pixel value is converted to 0 (white pixel) and the converted value is outputted.

Then, it is determined whether or not the pixel determined as a culling target and determined as the one in an edge region is the one of a half tone. Upon receiving the half tone determination result Fa, in a case where the target pixel is determined as the one of a half tone and the input pixel value is 1 (black pixel), then the determination result Fb of the pixel is set to ON (culling execution for toner saving) and the input pixel value is converted to 0 (white pixel) and the converted value is outputted. In a case where the half tone determination result Fa shows that the target pixel is not determined as the one of a half tone, then the determination result Fb is set to OFF (no culling execution for toner saving) the input pixel value is directly outputted, even if the pixel is determined as the one of an edge region.

Specifically, in a case where the target pixel is determined as a culling target and has an input pixel value of 1 (black pixel) and is not determined as an edge pixel or in a case where the target pixel is determined as an edge pixel but the half tone determination result Fa shows that the pixel is the one of a half tone region, then it is determined that the pixel should be culled. With regard to the pixel, the determination result Fb is set to ON (culling execution for toner saving) and the pixel value is converted to 0 (white pixel) and the converted value is outputted. In a case where a pixel determined as the culling target is a black pixel and the target pixel is determined as an edge pixel but the half tone determination result Fa shows that the pixel is not the one of a half tone region, then it is determined that the pixel should not be culled. Then, with regard to the pixel, the determination result Fb is set to OFF (no execution of culling for toner saving), the pixel value having 1 (black pixel) is directly outputted. This consequently reduces the toner consumption amount while suppressing a situation where the quality of an edge is deteriorated because an edge of a region other than a half tone region (e.g., characters) is undesirably culled. The above section has described a case in which the culling pattern was a checkered pattern. However, another culling pattern also may be used for toner save processing.

Figure 12A:
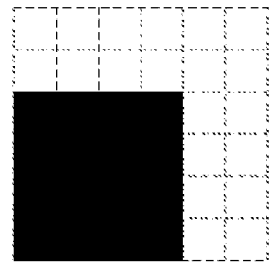
FIGS. 12A and 12B illustrate an example of an input/output image of the toner save processing unit.
Figure 12B:
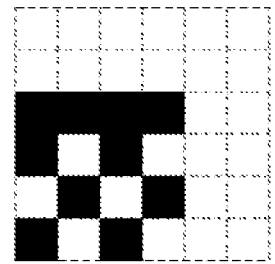

FIGS. 12A and 12B illustrate an example of the input/output image of the toner save processing unit 2330. As an example of the setting, a case is shown in which the edge detection setting is set to ON (only ed1 is ON) with regard to only the upper edge. FIG. 12A illustrates the input pixel data to the toner save processing unit 2330. As shown in FIG. 12B, with regard to this input pixel data, only the upper edge region is not subjected to a culling processing for toner saving and the other image regions are subjected to a culling processing having a checkered pattern for toner saving and the resultant image is outputted to a subsequent unit.

<Line Width Correction Processing Unit>

Figure 13:
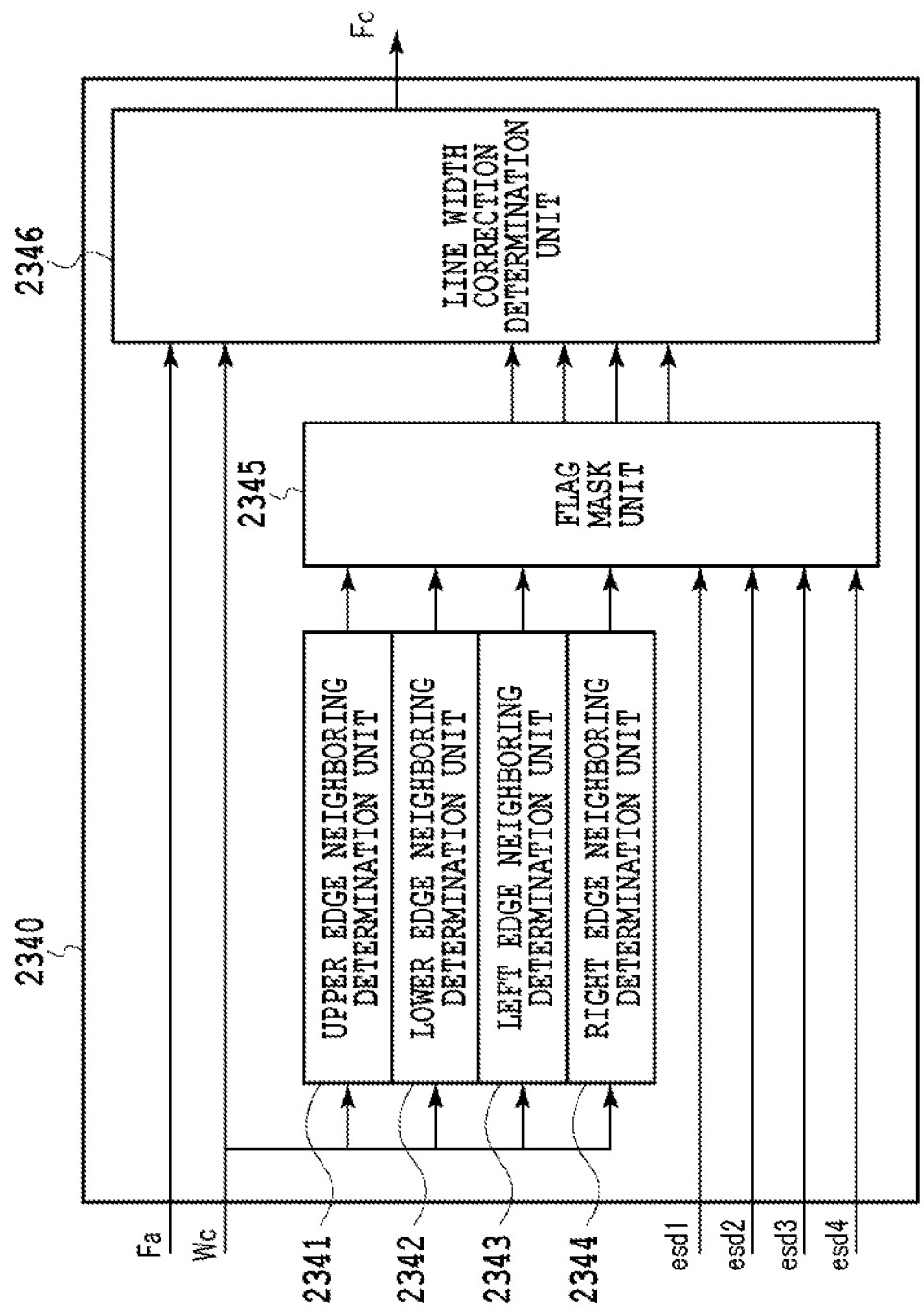
FIG. 13 illustrates an example of the configuration of a line width correction processing unit.

Next, with reference to FIG. 13, the line width correction processing unit 2340 will be described in detail. The line width correction processing unit 2340 mainly performs a line width correction processing to highlight a fine line or an object such as a small graphic. The line width correction processing unit 2340 receives, from the shared buffer unit 2310, the 3×3 pixel group Wc having a target pixel as a center. In the line width correction processing unit 2340, firstly, the pixel group Wc is inputted to the four edge neighboring determination units 2341 to 2344. The four edge neighboring determination units 2341 to 2344 execute an edge neighboring determination processing in four directions, respectively. The edge neighboring determination processing is a processing to determine whether or not the target pixel is a white pixel provided at a neighboring boundary between a black pixel and a white pixel.

FIGS. 14A to 14E illustrate the processing by the edge neighboring determination units 2341 to 2344. The 3×3 matrix in FIG. 14A shows the pixel group Wc inputted to the edge neighboring determination units 2341 to 2344. The shaded part shows a target pixel. In FIG. 14B, the target pixel in the pixel group and the pixels for the upper and lower regions thereof are shown. It is determined whether or not the target pixel and the upper region pixel in the pixel group Wc of FIG. 14A are a white pixel and the lower region pixel is a black pixel. This determination is executed by the upper edge neighboring determination unit 2341. In a case where the target pixel and the upper region pixel are a white pixel and the lower region pixel is a black pixel, then the upper edge neighboring determination unit 2341 determines that the target pixel is an upper edge neighboring pixel and outputs the determination result to the subsequent flag mask unit 2345. Similarly, in FIG. 14C, the lower edge neighboring determination unit 2342 refers to the target pixel and the pixels for the upper and lower regions thereof to determine whether or not the target pixel and the lower region pixel are a white pixel and the upper region pixel is a black pixel to thereby determine whether the target pixel is a lower edge neighboring pixel. In FIG. 14D, the left edge neighboring determination unit 2343 refers to the target pixel and the pixels for the left and right regions thereof to thereby determine whether or not the target pixel and the left region pixel are a white pixel and the right region pixel is a black pixel to thereby determine whether or not the target pixel is a left edge neighboring pixel. Similarly, in FIG. 14E, the right edge neighboring determination unit 2344 refers to the target pixel and the pixels for the left and right regions thereof to thereby determine whether or not the target pixel and the right region pixel are a white pixel and whether or not the left region pixel is a black pixel to thereby determine whether or not the target pixel is a right edge neighboring pixel.

Next, the flag mask unit 2345 performs a processing to mask the above-described edge neighboring determination result in the upper, lower, left and right directions. The mask processing provides, even if an edge neighboring position is detected, the determination result showing that no edge neighboring position is detected can be outputted to a subsequent unit. In this embodiment, among the edge neighboring determination results of the upper, lower, left, and right directions, an edge neighboring determination result for the edge detection direction of the toner save processing is masked. The masked determination result is outputted to the line width correction determination unit 2346. In this manner, the edge detection direction and the edge neighboring detection direction are controlled in an excluded manner to thereby avoid an unnatural edge processing.

Specifically, the flag mask unit 2345 refers to the edge neighboring detection setting signals esd1 to esd4 inputted by the CPU 2100 based on the setting (will be described later) to determine whether to mask the respective edge neighboring determination results or not. The reference numerals esd1 to esd4 represents the upper, lower, left, and right edge neighboring detection settings, respectively. For example, in a case where esd1 is set to OFF, the flag mask unit 2345 masks the edge neighboring determination signal outputted from the upper edge neighboring determination unit 2341 to output the determination result to a subsequent unit. Specifically, even if the upper edge neighboring determination unit 2341 detects the upper edge neighboring position, the determination result showing that no upper edge neighboring position is detected is outputted to a subsequent unit. In a case where esd1 is set to ON on the other hand, in a case where the upper edge neighboring determination unit 2341 detects the upper edge neighboring position, the determination result is directly outputted to a subsequent unit. A similar processing is applied by esd2 to the determination result of the lower edge neighboring position, applied by esd3 to the determination result of the left edge neighboring position, and applied by esd4 to the determination result of the right edge neighboring position. In this manner, the flag mask unit 2345 outputs the edge neighboring determination results (edge neighboring position information) in the direction for which esd1 to esd4 are ON to the subsequent line width correction determination units 2346.

Next, the line width correction determination unit 2346 determines whether or not to plump the current target pixel for the line width correction (or to substitute a white pixel with a black pixel) to output the determination result Fc to a subsequent unit. This determination is executed by referring to the half tone determination result Fa, the target pixel data constituting a part of Wc, and the upper, lower, left and right edge neighboring determination results.

Specifically, the line width correction determination unit 2346 refers to the masked upper, lower, left and right edge neighboring determination results inputted from the flag mask unit 2345 to determine whether or not the target pixel is at an edge neighboring position. For example, in a case where any of the masked upper, lower, left and right edge neighboring determination results determines that the target pixel is at an edge neighboring position, then the target pixel is determined as the one in the edge neighboring region. In a case where any of the masked upper, lower, left and right edge neighboring determination results determines that the target pixel is not at an edge neighboring position, then the target pixel is determined as the one not in the edge neighboring region. In a case where the target pixel is determined as not the one in the edge neighboring region, then the determination result Fc is set to OFF (no execution of the line width correction processing) and the input pixel value is directly outputted. In a case where the target pixel is determined as an edge neighboring region, then whether or not the pixel is the one of a half tone is determined. If the half tone determination result Fa shows that the target pixel is determined as the one of a half tone, even if the pixel is determined as the one in the edge neighboring region, the determination result Fc is set to OFF (no execution of the line width correction processing) and the input pixel value is directly outputted. In a case where the half tone determination result Fa determines that the target pixel is not the one of a half tone, the determination result Fc for the pixel is set to ON (line width correction processing execution) and the input pixel value is converted to 1 (black pixel) and the converted value is outputted.

Specifically, in a case where the target pixel is determined as an edge neighboring pixel and the half tone determination result Fa shows that the pixel is not the one in a half tone region and the inputted pixel value is 0 (white pixel), then the determination result Fc for the target pixel is a signal for outputting a pixel value different from the input pixel value. In the case other than the above case, then the determination result Fc for the target pixel is a signal for outputting the same pixel value as the input pixel value. This consequently improves the quality of a fine line or an object such as a small graphic while suppressing the deteriorated quality of the edge due to the highlighted edge of a halftone dot of the half tone region.

Figure 15A:
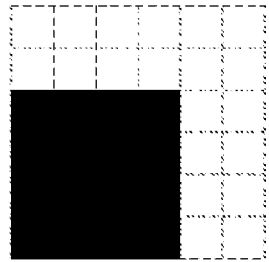
FIGS. 15A and 15B illustrate an example of the input/output image of the line width correction processing unit.
Figure 15B:
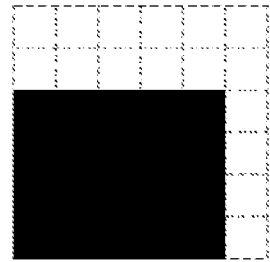

FIGS. 15A and 15B illustrate an example of the input/output image of the line width correction processing unit 2340. As an example of the setting, a case is shown in which the edge neighboring detection setting is set to ON (only esd4 is set to ON) with regard to the right edge only. FIG. 15A shows the input pixel data to the line width correction processing unit 2340. With regard to this input pixel data, as shown in FIG. 15B, only the right edge is subjected to the line width correction processing and the input image with regard to the other image regions is directly outputted to the subsequent unit.

<Tailing Suppression Processing Unit>

Figure 16:
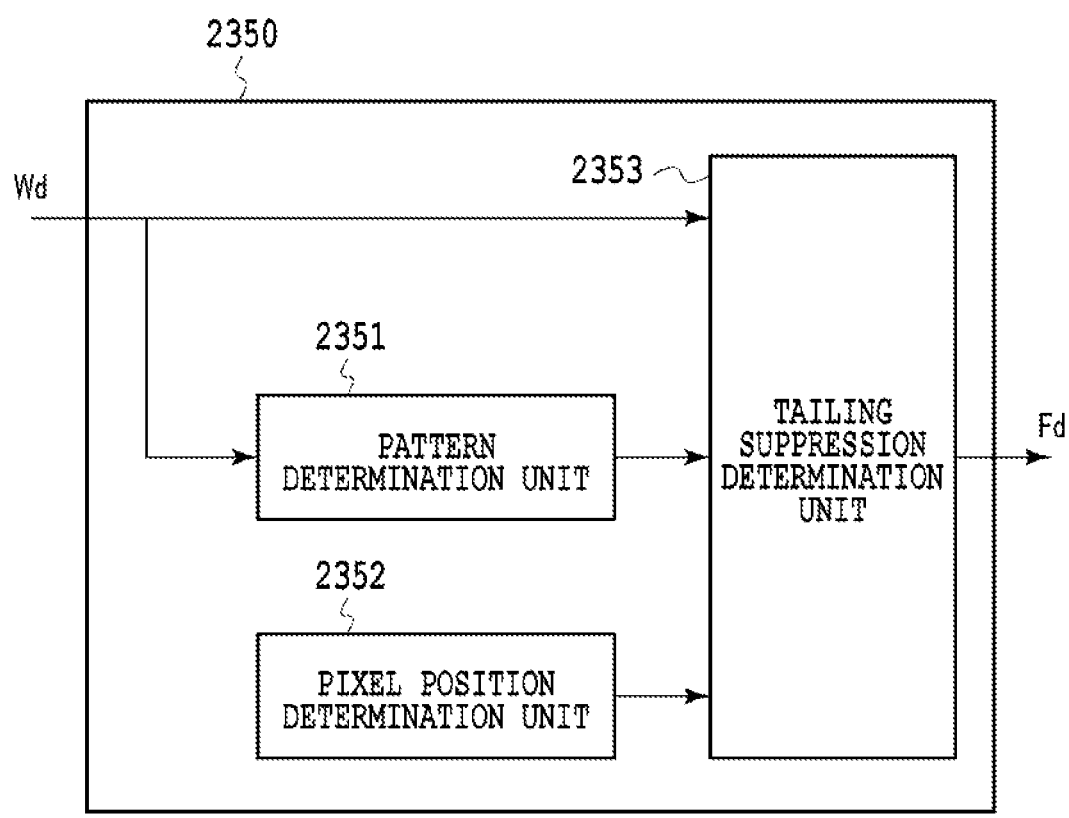
FIG. 16 illustrates an example of the configuration of the tailing suppression processing unit.

Next, with reference to FIG. 16, the tailing suppression processing unit 2350 will be described in detail. It is noted that the tailing suppression processing unit 2350 executes the culling processing based on an algorithm different from that of the toner save processing unit 2330. This culling processing is executed for the purpose of avoiding the scattering of toner on the print medium 11 which is caused, in a case where the print medium 11 in FIG. 3 is conveyed by the fixing roller 32 and the pressurization roller 33, by a rapid temperature increase due to a heater in the fixing roller. This scattering is caused because the rapid temperature increase generates steam from the water in the print medium 11 and the steam in a part having a high toner load amount has no place to go and blows off the toner toward the rear side of the conveying direction of the print medium 11, thus causing a deteriorated image quality. This is also called as a tailing. The tailing suppression processing unit 2350 receives the 5×9 pixel group Wd from the shared buffer unit 2310. In the tailing suppression processing unit 2350, firstly, the pixel group Wd is inputted to the pattern determination unit 2351.

Figure 17A:
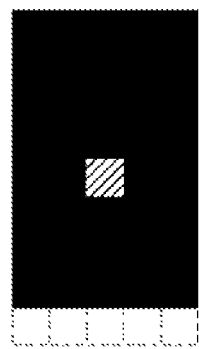
FIGS. 17A and 17B illustrate examples of pattern pixel groups used in the pattern determination processing in the tailing suppression processing unit.
Figure 17B:

The pattern determination unit 2351 determines whether or not the inputted pixel group Wd matches the specific pattern pixel group to output the determination result (pattern matching determination result) to the subsequent tailing suppression determination unit 2353. FIGS. 17A and 17B illustrate examples of the pattern pixel group. The shaded part shows a target pixel. The pattern determination unit 2351 can make the determination using one or more pattern pixel groups. In a case where the inputted pixel group Wd matches any one of the pattern pixel groups of FIG. 17A or FIG. 17B, the pattern determination unit 2351 outputs, to the subsequent tailing suppression determination unit 2353, a signal showing that the inputted pixel group Wd matches the pattern pixel group.

The pixel position determination unit 2352 generates the signal showing the position of the currently-processed target pixel and outputs the signal to the tailing suppression determination unit 2353. For example, in a case where the tailing suppression processing also uses a culling pattern of a checkered pattern, this output signal functions as a signal showing that the target pixel is in an odd number line or in an even number line within the processing page in the sub scanning direction or showing that the target pixel is in an odd number line or in an even number line in the main scanning direction. This signal is used for the subsequent culling processing.

Next, the tailing suppression determination unit 2353 refers to the target pixel data constituting a part of the pixel group Wd, the pattern matching result, and the target pixel position information to determine whether the current target pixel should be culled for tailing suppression or not and outputs the determination result Fd to a subsequent unit. As an example, as in the above-described culling for toner saving, the target pixel position information is referred to. In a case where the target pixel position is in an odd number line, the odd number pixel is determined as a culling target. In a case where the target pixel position is in an even number line, the even number pixel is determined as a culling target. Thus, pixels determined as a culling target are arranged to form a checkered pattern over the entire image. The tailing suppression determination unit 2353 receives a signal showing whether the pixel matches the pattern pixel group or not and the input pixel value of the target pixel to refer, together with the information, to whether the target pixel is a culling target or not to generate the determination result Fd. In a case where it is determined that the pixel matches the pattern group and the input pixel value is 1 (black pixel) and the target pixel is a culling target, the target pixel is set so that the determination result Fd is ON (execution of culling for tailing suppression) and the input pixel value is converted to 0 (white pixel) and the converted value is outputted. In the case other than the above (i.e., in a case where it is determined that the pixel does not match the pattern pixel group, the input pixel value is 0 (white pixel), or the pixel is not a culling target), then the determination result Fd is set to OFF (no execution of culling for tailing suppression) and the input pixel value is directly outputted.

Figure 18A:
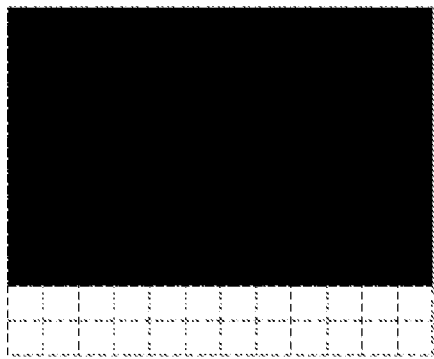
FIGS. 18A and 18B illustrate an example of the input/output image of the tailing suppression processing unit.
Figure 18B:
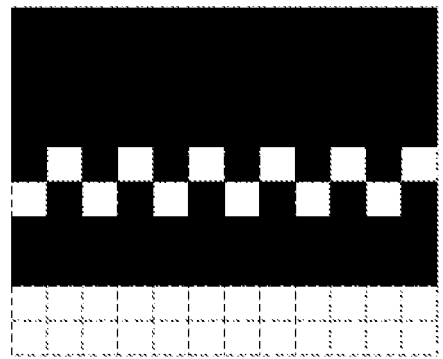

FIGS. 18A and 18B show an example of the input/output image of the tailing suppression processing unit 2350. FIG. 18A illustrates the input pixel data to the tailing suppression processing unit 2350. This input pixel data is, as shown in FIG. 18B, converted to an image for which the culling processing for the tailing suppression is executed only to pixel positions matching the pattern to form a checkered pattern and the converted image is outputted to the subsequent unit. Although this section has described a case in which a culling pattern of a checkered pattern was used, another culling pattern also may be used for the tailing suppression processing.

<Dot Dispersion Processing Unit>

Figure 19:
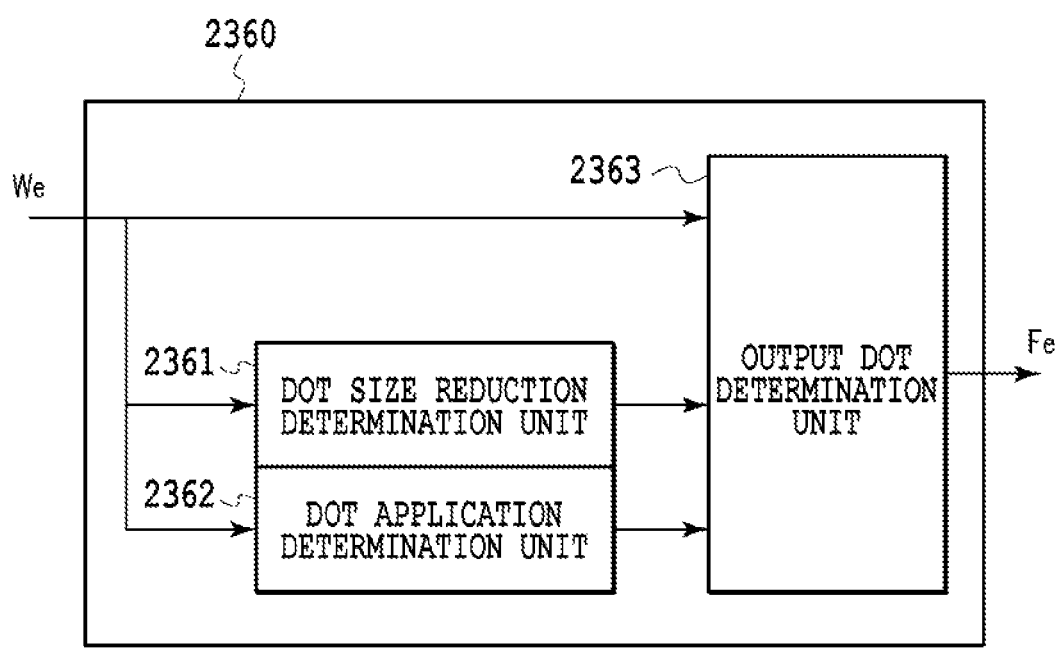
FIG. 19 illustrates an example of the configuration of a dot dispersion processing unit.

Next, with reference to FIG. 19, the dot dispersion processing unit 2360 will be described in detail. The dot dispersion processing unit 2360 performs the processing for the purpose of preventing the situation in which white dots printed on a print medium 11 are excessively large depending on the performance of the image forming unit 1200 to result in an image having an unattractive appearance. Specifically, white dots in a specific pattern within the image are size-reduced and dispersed while maintaining the density. The dot dispersion processing unit 2360 receives the 27×27 pixel group We from the shared buffer unit 2310. In the dot dispersion processing unit 2360, firstly, the pixel group We is inputted to the dot size reduction determination unit 2361 and the dot application determination unit 2362.

In a case where the target pixel position has a white pixel and the 27×27 pixel group We includes white pixels existing in a point-symmetric manner in four diagonal directions having the target pixel position as a center, then the dot size reduction determination unit 2361 outputs, to a subsequent output dot determination unit 2363, a signal for executing the dot size reduction.

In a case where the target pixel position has a black pixel and the 27×27 pixel group We includes white pixels existing in a point-symmetric manner in the four upper, lower, left and right directions having the target pixel position as a center, the dot application determination unit 2362 outputs, to the subsequent output dot determination unit 2363, a signal for executing dot application.

Next, the output dot determination unit 2363 determines whether or not the white dots of the current target pixel should be size-reduced and whether or not white dots should be applied to the target pixel position to output the determination result Fe to the subsequent final output determination unit 2370. This determination is executed by referring to the target pixel data constituting a part of the We, the dot size reduction determination result, and the dot application determination result. With regard to the target pixel subjected to the dot size reduction determination, the input pixel value is converted to 1 (black pixel) and the converted value is outputted. With regard to the target pixel subjected to the dot application determination, the input pixel value is converted to 0 (white pixel) and the converted value is outputted. If the target pixel does not apply to none of the above determinations, then the input pixel value is directly outputted.

Figure 20A:
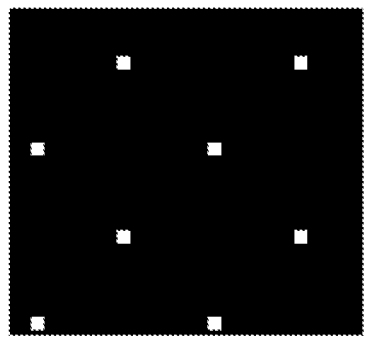
FIGS. 20A and 20B illustrate an example of the input/output image of the dot dispersion processing unit.
Figure 20B:
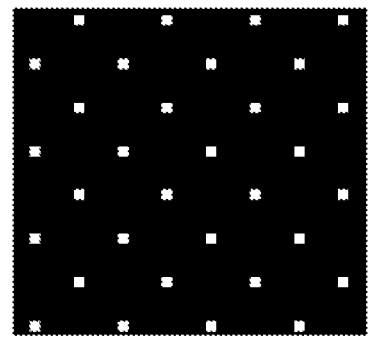

FIGS. 20A and 20B show an example of the input/output image of the dot dispersion processing unit 2360. FIG. 20A illustrates the input pixel data to the dot dispersion processing unit 2360. This input pixel data is converted to pixel data for which white dots in the pixel data are size-reduced and dispersed as shown in FIG. 20B and the converted data is outputted to the subsequent final output determination unit 2370.

<Final Output Determination Unit>

The final output determination unit 2370 determines the final output pixel value of the binary image processing unit 2303 to output the resultant value as the pixel data Dd to a subsequent unit. The final output determination unit 2370 receives the pixel Wa as a target pixel from the shared buffer unit 2310 and the respective determination results Fb, Fc, Fd, and Fe from the respective image processing units (2330 to 2360). The final output determination unit 2370 receives these inputs and outputs a different pixel value in a case where any one of Fb, Fc, Fd, and Fe has a signal outputting a pixel value different from the pixel Wa. Specifically, in a case where pixel Wa is 0 (white pixel) and any one of Fb, Fc, Fd, and Fe shows an output of 1 (black pixel), 1 (black pixel) is outputted. On the contrary, in a case where the pixel Wa is 1 (black pixel) and anyone of Fb, Fc, Fd, and Fe shows an output of 0 (white pixel), 0 (white pixel) is outputted. In a case where the pixel Wa has a pixel value equal to all output pixel values shown by Fb, Fc, Fd, and Fe, the pixel value of the pixel Wa is directly outputted.

The final output determination unit 2370 may be configured to ignore a partial result depending on the setting instead of referring to all results Fb, Fc, Fd, and Fe. For example, in a case where the printer unit 102 not requiring a dot dispersion processing exists in a subsequent stage, the dot dispersion processing result Fe may not be included in the determination. If the respective image processing units arranged in parallel have a different processing delay amount, an delay amount adjustment circuit may be provided in the final output determination unit.

<Copier Operation Flow>

Figure 21:
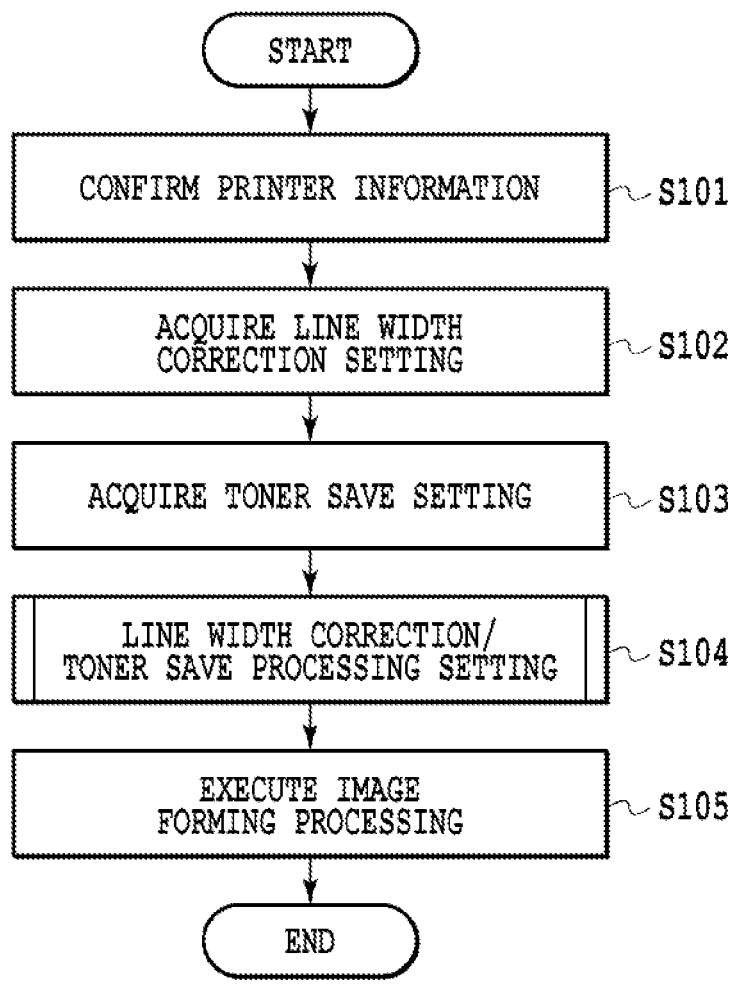
FIG. 21 illustrates an example of an operation flowchart for the image forming of a copier.

FIG. 21 is a flowchart illustrating the image forming operation performed by the copier to a print medium. The operation is executed by the CPU 2100 in the controller 200. The program of this operation flowchart is stored in the HDD storage unit 2130 as a function to be realized by the copier. This program is read from the HDD storage unit 2130 to the RAM 2110 by allowing the CPU 2100 to execute a boot program. Then, the program is processed by allowing the CPU 2100 to execute the program read onto the RAM 2110.

First, in Step S101, the CPU 2100 communicates with the CPU provided in the printer unit 120 to acquire printer information for the image processing required for the image forming processing. As an example, such information is acquired that is related to whether or not the culling processing in the tailing suppression processing unit 2350 or the dot dispersion processing by the dot dispersion processing unit 2360 is allowed to function. As a result, the CPU 2100 optionally sets the final output determination unit 2370 to not to refer all of the results for Fb, Fc, Fd, and Fe but to ignore a part of the results.

Next, in Step S102, the CPU 2100 acquires information regarding the line width correction setting. The information may be acquired from the information inputted by the user to the operation unit 160 or may be acquired from the setting information on a driver installed on the user PC 61 for example. If the setting information must be changed depending on the type or status of the printer unit 120, the CPU provided in the printer unit 120 is further communicated to acquire information regarding the line width correction setting.

Next, in Step S103, the CPU 2100 acquires the toner save setting information. This may be acquired from the information inputted from the user to the operation unit 160 or may be acquired from the setting information on a driver installed on the user PC 61 for example.

Figure 23:
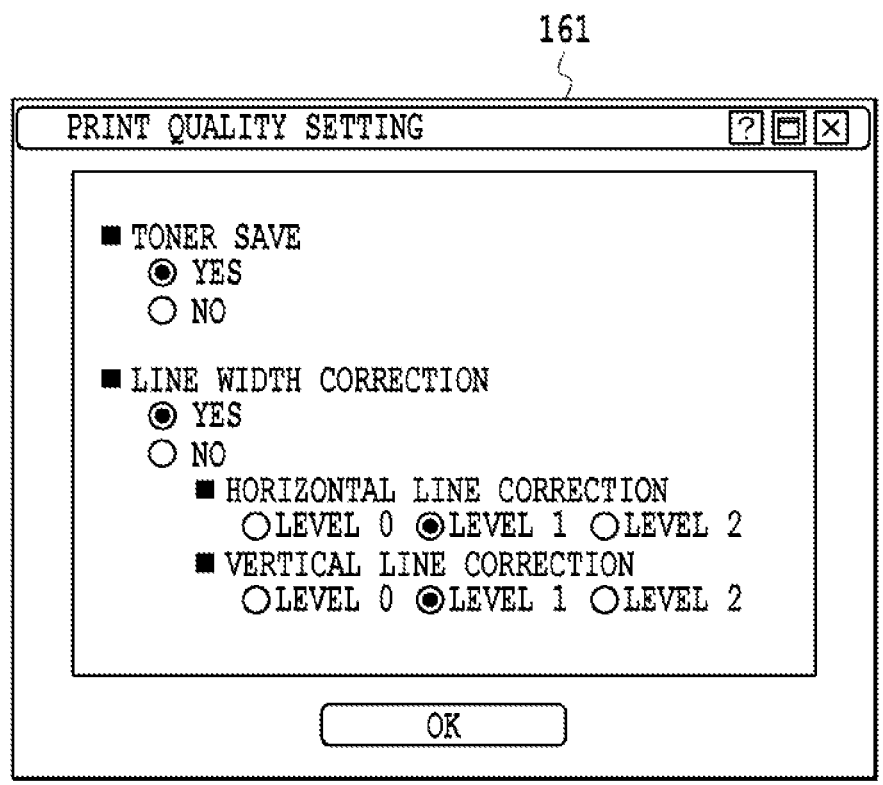
FIG. 23 illustrates an example of a setting screen of a liquid crystal operation panel on the operation unit.

With reference to FIG. 23, an example of the input information acquisition in the operation unit 160 will be described. FIG. 23 illustrates an example of the setting screen on the liquid crystal operation panel 161 on the operation unit 160. The liquid crystal operation panel 161 displays the print quality setting screen for user setting. Here, the user determines first whether or not the toner save processing for reducing the toner consumption amount is executed. In addition to this, the user selects whether or not a line width correction processing is executed to plump width of the black character or the line. The line width correction is determined with a selected horizontal line correction level in a range from 0 to 2. The horizontal line correction means a correction to plump the image in the horizontal direction. The level shows the correction strength. The vertical line correction means a correction to plump the image in the vertical direction. The level shows the correction strength. The user sets whether or not these corrections are executed and sets the levels. The CPU 2100 acquires the setting details on the liquid crystal operation panel 161.

Next, in Step S104, the CPU 2100 actually sets, to the toner save processing unit 2330 and the line width correction processing unit 2340, the setting information acquired in Step S102 and Step S103. The details of the setting will be described later with reference to FIG. 22.

In Step S105, the CPU 2100 executes the image forming processing of the copier. Specifically, the print pixel data received from the user PC 60 for example via the LAN 50 is developed to bitmap data by the RIP 2600 and the developed bitmap data is outputted to the printer IF image processing unit 2300. The outputted pixel data is subjected, in the printer IF image processing unit 2300, to a desired image processing (e.g., a color space processing, a halftone processing, a binary image processing) and the resultant data is outputted to the image forming unit 1200. The respective binary image processings in binary image processing unit 2303 are executed based on the processing setting in Step S104. Then, the CPU 2100 communicates with the CPU provided in the printer unit 120 to control the image forming unit 1200 and conveys the print medium 11 from the paper cassettes 121 to 123. Furthermore, the desired toner image formed of the outputted pixel data is transferred and fixed onto the print medium 11 and the resultant print medium 11 is discharged by a discharge roller (not shown) into the discharge tray 124 (see FIG. 3).

<Line Width Correction/Toner Save Processing Setting Flow>

Figure 22B:
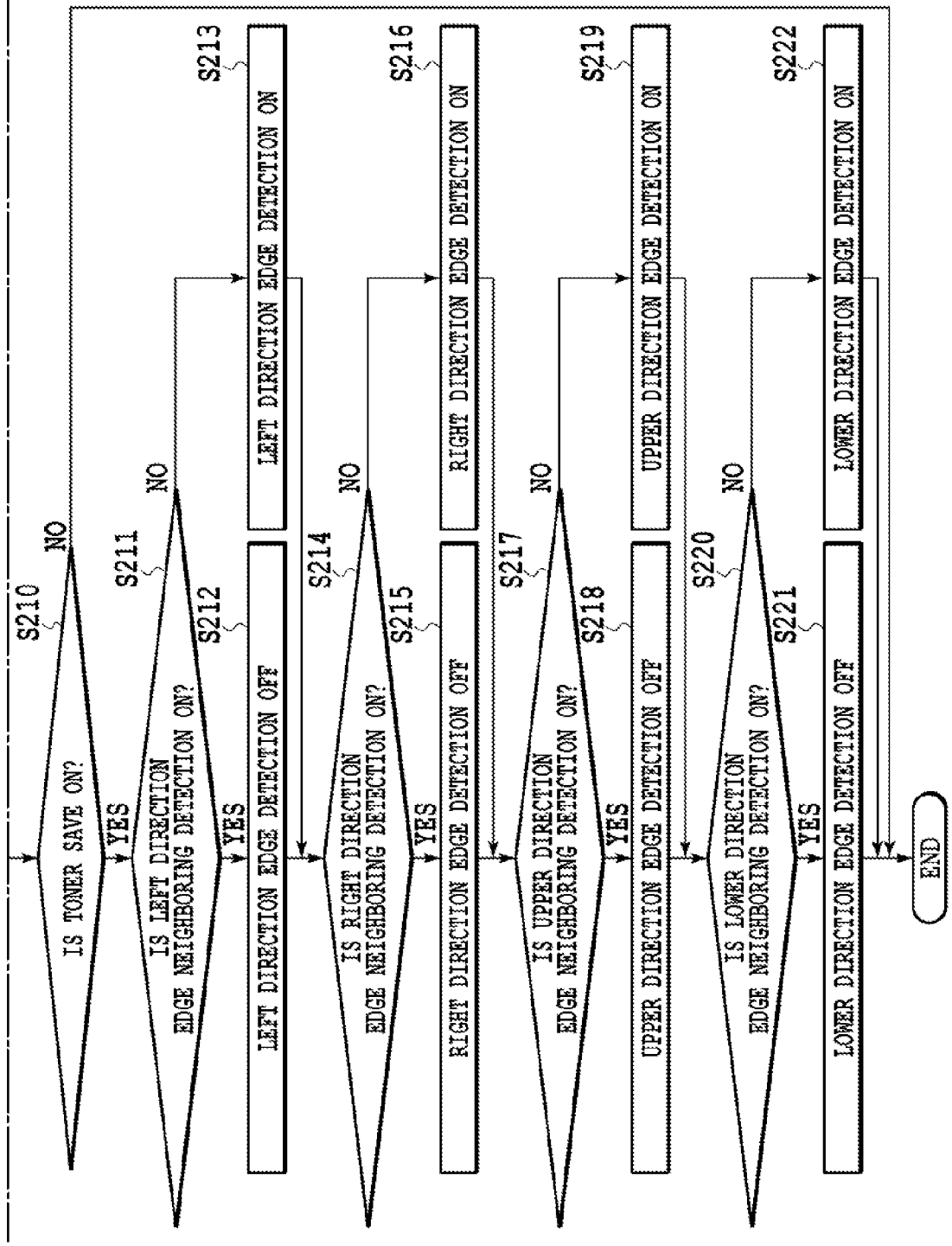

FIG. 22 is a diagram showing a relationship between FIGS. 22A and 22B, and FIGS. 22A and 22B are flowcharts showing an operation according to a first embodiment. FIGS. 22A and 22B illustrate the operation flow of the line width correction/toner save processing setting (edge/edge neighboring detection direction setting flow). FIGS. 22A and 22B show the specific details of Step S104 in FIG. 21. The flowchart of FIGS. 22A and 22B is processed by allowing, after FIG. 21, the CPU 2100 to execute the program read on the RAM 2110. Various setting information in this flowchart is acquired from the information inputted to the operation unit 160 from the user in Step S102 and Step S103 and from the setting information on the driver.

Step S201 to Step S209 mainly relate to the operation setting processing performed by the CPU 2100 to the line width correction processing unit 2340. Specifically, edge neighboring detection setting signals esd1 to esd4 are set to control the edge neighboring detection direction (or to set a predetermined direction).

First, in Step S201, the CPU 2100 determines whether the line width correction setting is ON or not. In a case where the setting is ON, the processing proceeds to Step S202. In a case where the setting is OFF, the processing proceeds to Step S210.

Next, in Step S202, the CPU 2100 determines whether the horizontal line correction level is 0 or not. In a case where the horizontal line correction level is 0, the processing proceeds to Step S206. In a case where the horizontal line correction level is not 0, the processing proceeds to Step S203.

In Step S203, whether the horizontal line correction level is 1 or not is determined. In a case where the horizontal line correction level is 1, the processing proceeds to Step S205. In a case where the horizontal line correction level is not 1, it is determined that the horizontal line correction level is 2 and the processing proceeds to Step S204.

In Step S204, the CPU 2100 sets the left direction edge neighboring detection to ON. Specifically, the CPU 2100 sets the esd3 signal inputted to the line width correction processing unit 2340 to ON. As a result, in the line width correction processing unit 2340, the left edge neighboring determination result not masked by the flag mask unit 2345 is inputted to the line width correction determination unit 2346.

In Step S205, the CPU 2100 sets the right direction edge neighboring detection to ON. Specifically, the CPU 2100 sets the esd4 signal inputted to the line width correction processing unit 2340 to ON. As a result, in the line width correction processing unit 2340, the right edge neighboring determination result not masked by the flag mask unit 2345 is inputted to the line width correction determination unit 2346.

Next, in Step S206, the vertical line correction level in a case where the line width correction setting is ON is determined. First, in Step S206, the CPU 2100 determines whether the vertical line correction level is 0 or not. In a case where the vertical line correction level is 0, the processing proceeds to Step S210. In a case where the vertical line correction level is not 0, the processing proceeds to Step S207.

Next, in Step S207, whether the vertical line correction level is 1 or not is determined. In a case where the vertical line correction level is 1, the processing proceeds to Step S209. In a case where the vertical line correction level is not 1, it is determined that the vertical line correction level is 2. Then, the processing proceeds to Step S208.

In Step S208, the CPU 2100 sets the upper direction edge neighboring detection to ON. Specifically, the CPU 2100 sets the esd1 signal inputted to the line width correction processing unit 2340 to ON. As a result, in the line width correction processing unit 2340, the upper edge neighboring determination result not masked by the flag mask unit 2345 is inputted to the line width correction determination unit 2346.

In Step S209, the CPU 2100 sets the lower direction edge neighboring detection to ON. Specifically, the CPU 2100 sets the esd2 signal inputted to the line width correction processing unit 2340 to ON. As a result, in the line width correction processing unit 2340, the lower edge neighboring determination result not masked by the flag mask unit 2345 is inputted to the line width correction determination unit 2346.

Next, in Step S210 and the subsequent steps are related to the operation setting processing performed by the CPU 2100 to the toner save processing unit 2330. Specifically, the edge detection setting signals ed1 to ed4 are set to control the edge detection direction (or to set a direction other than a predetermined direction).

First, in Step S210, the CPU 2100 determines whether the toner save setting is ON or not. In a case where the setting is ON, the processing proceeds to Step S211. In a case where the setting is OFF, this flowchart is completed.

In Step S211, the CPU 2100 confirms the left direction edge neighboring detection setting for the left direction edge detection setting for toner saving. Specifically, the CPU 2100 confirms whether the esd3 signal inputted to the line width correction processing unit 2340 is set to ON or not in Step S204. In a case where the CPU 2100 in Step S204 sets the esd3 signal to ON, the processing proceeds to Step S212. In a case where the CPU 2100 in Step S204 does not the esd3 signal to ON, the processing proceeds to Step S213.

In Step S212, the CPU 2100 sets the left direction edge detection to OFF. Specifically, the edge detection setting signal ed3 inputted to the toner save processing unit 2330 is set to OFF. As a result, in the toner save processing unit 2330, the left edge determination result by the left edge determination unit 2333 is masked by the flag mask unit 2335 and is not inputted to the toner save determination unit 2337.

In Step S213, the CPU 2100 sets the left direction edge detection to ON. Specifically, the edge detection setting signal ed3 inputted to the toner save processing unit 2330 is set to ON. As a result, in the toner save processing unit 2330, the left edge determination result by the left edge determination unit 2333 is not masked by the flag mask unit 2335 and is inputted to the toner save determination unit 2337.

Next, in Step S214, the CPU 2100 confirms the right direction edge neighboring detection setting for the right direction edge detection setting for toner saving. Specifically, the CPU 2100 confirms whether the esd4 signal inputted to the line width correction processing unit 2340 is set to ON or not in Step S205. In a case where the CPU 2100 in Step S205 sets the esd4 signal to ON, then the processing proceeds to Step S215. In a case where the CPU 2100 in Step S205 does not set the esd4 signal to ON, then the processing proceeds to Step S216.

In Step S215, the CPU 2100 sets the right direction edge detection to OFF. Specifically, the edge detection setting signal ed4 inputted to the toner save processing unit 2330 is set to OFF. As a result, in the toner save processing unit 2330, the right edge determination result by the right edge determination unit 2334 is masked by the flag mask unit 2335 and is not inputted to the toner save determination unit 2337.

In Step S216, the CPU 2100 sets the right direction edge detection to ON. Specifically, the edge detection setting signal ed4 inputted to the toner save processing unit 2330 is set to ON. As a result, in the toner save processing unit 2330, the right edge determination result by the right edge determination unit 2334 is not masked by the flag mask unit 2335 and is inputted to the toner save determination unit 2337.

Next, in Step S217, the CPU 2100 confirms the upper direction edge neighboring detection setting for the upper direction edge detection setting for toner saving. Specifically, the CPU 2100 confirms whether the esd1 signal inputted to the line width correction processing unit 2340 is set to ON or not in Step S208. In a case where the esd1 signal is set to ON by the CPU 2100 in Step S208, the processing proceeds to Step S218. In a case where the esd1 signal is not set to ON by the CPU 2100 in Step S208, the processing proceeds to Step S219.

In Step S218, the CPU 2100 sets the upper direction edge detection to OFF. Specifically, the edge detection setting signal ed1 inputted to the toner save processing unit 2330 is set to OFF. As a result, in the toner save processing unit 2330, the upper edge determination result by the upper edge determination unit 2331 is masked by the flag mask unit 2335 and is not inputted to the toner save determination unit 2337.

In Step S219, the CPU 2100 sets the upper direction edge detection to ON. Specifically, the edge detection setting signal ed1 inputted to the toner save processing unit 2330 is set to ON. As a result, in the toner save processing unit 2330, the upper edge determination result by the upper edge determination unit 2331 is not masked by the flag mask unit 2335 and is inputted to the toner save determination unit 2337.

Next, in Step S220, the CPU 2100 confirms the lower direction edge neighboring detection setting for the lower direction edge detection setting for toner saving. Specifically, the CPU 2100 confirms whether or not the esd2 signal inputted to the line width correction processing unit 2340 is set to ON in Step S209. In a case where the esd2 signal is set to ON by the CPU 2100 in Step S209, the processing proceeds to Step S221. In a case where the esd2 signal is not set to ON in Step S209, the processing proceeds to Step S222.

In Step S221, the CPU 2100 sets the lower direction edge detection to OFF. Specifically, the edge detection setting signal ed2 inputted to the toner save processing unit 2330 is set to OFF. As a result, in the toner save processing unit 2330, the lower edge determination result by the lower edge determination unit 2332 is masked by the flag mask unit 2335 and is not inputted to the toner save determination unit 2337.

In Step S222, the CPU 2100 sets the lower direction edge detection to ON. Specifically, the edge detection setting signal ed2 inputted to the toner save processing unit 2330 is set to ON. As a result, in the toner save processing unit 2330, the lower edge determination result by the lower edge determination unit 2332 is not masked by the flag mask unit 2335 and is inputted to the toner save determination unit 2337.

After the processing in Step S221 or Step S222 is completed, this flowchart is completed.

As shown in the above flowchart, by Step S204 and Steps S211 to S213, the CPU 2100 sets the left direction edge neighboring detection setting of the line width correction processing and the left direction edge detection setting of the toner save processing in an exclusive manner. The CPU 2100 performs an exclusive setting on the right direction in Step S205 and Step S214 to S216, on the upper direction in Step S208 and Steps S217 to S219, on the lower direction in Step S209 and Steps S220 to S222, respectively. Specifically, the line width correction processing unit and the toner save processing unit is subjected to an edge detection setting (the edge neighboring detection setting and the edge detection setting) so that the toner save processing is performed on an edge of an object such as a fine line subjected to a line width correction processing.

If there is an specified edge detection direction regarding edge detection direction for toner save processing regardless of the line width correction setting, an order of the processings in Steps S201 to S209 and the processings in Steps S210 to S222 may be reversed. Specifically, the CPU 2100 firstly determines the edge detection direction of the toner save processing to provide a control so that the edge neighboring detection direction of the line width correction processing is determined to be exclusive to the firstly determined direction. Specifically, the processings may be performed in any order so long as the edge detection direction of the toner save processing and the edge neighboring detection direction of the line width correction processing are exclusive to each other.

<Toner Save Processing/Line Width Correction Processing Setting>

FIGS. 24A and 24B illustrate an example of the setting result in a case where the line width correction/toner save processing setting flow shown in FIG. 22 is executed. FIGS. 24A and 24B show an example of the edge detection setting of the toner save processing and the edge neighboring detection setting of the line width correction processing in a case where the line width correction processing is set to ON in Step S201 in FIG. 22 and the toner save processing is also set to ON in Step S210.

First, FIG. 24A shows a relation between the left and right edge detection settings of the toner save processing and the left and right edge neighboring detection settings of the line width correction processing. For example, in a case where the setting screen of the liquid crystal operation panel 161 shown in FIG. 23 shows the horizontal line correction level set to 0, then the line width correction processings of the left right direction are set to OFF (the left and right edge neighboring detection settings are set to OFF). Thus, the left and right edges do not change depending on the line width correction processing. Thus, the left and right edge detections in the toner save processing are set to ON. Specifically, the toner save processing unit 2330 detects both of left and right edges and the parts are not subjected to a culling processing.

Next, in a case where the horizontal line correction level is set to 1, only the right direction line width correction processing is set to ON (only the right edge neighboring detection setting is set to ON). Thus, only the right edge changes depending on the line width correction processing. Thus, the right edge detection in the toner save processing is set to OFF. Specifically, the toner save processing unit 2330 does not detect a right edge and the part is subjected to a culling processing even if the part is an edge region of the input image.

Next, in a case where the horizontal line correction level is set to 2, the line width correction processings of the left and right direction are set to ON (the left and right edge neighboring detection settings are ON). Thus, the left and right edges both change due to the line width correction processing. Thus, the left and right edge detections in the toner save processing are both set to OFF. Specifically, the toner save processing unit 2330 does not detect the left and right edges. The part is subjected to the culling processing even if the part is an edge region of the input image.

Next, FIG. 24B illustrates the relation between the upper and lower edge detection settings in the toner save processing and the upper and lower edge neighboring detection settings in the line width correction processing. For example, in a case where the setting screen of the liquid crystal operation panel 161 shown in FIG. 23 for example sets the vertical line correction level to 0, then the line width correction processings in the upper and lower directions are set to OFF (the upper and lower neighboring edge detection settings are OFF). Thus, the upper and lower edges do not change due to the line width correction processing. Thus, the upper and lower edge detections in the toner save processing are ON. Specifically, the toner save processing unit 2330 detects both of the upper and lower edges and the parts are not subjected to a culling processing.

Next, in a case where the vertical line correction level is set to 1, only the line width correction processing in the lower direction is set to ON (only the lower edge neighboring detection setting is ON). Thus, only the lower edge changes due to the line width correction processing. Thus, the lower edge detection in the toner save processing is OFF. Specifically, the toner save processing unit 2330 does not detect the lower edge. The part is subjected to a culling processing even if the part is an edge region of the input image.

Next, in a case where the vertical line correction level is set to 2, the line width correction processings in the upper and lower directions are set to ON (the upper and lower edge neighboring detection settings are ON). Thus, the upper and lower edges both change due to the line width correction processing. Thus, the upper and lower edge detections in the toner save processing are both OFF. Specifically, the toner save processing unit 2330 does not detect the upper and lower edges. The part is subjected to a culling processing even if the part is an edge region of the input image.

Figure 25A:
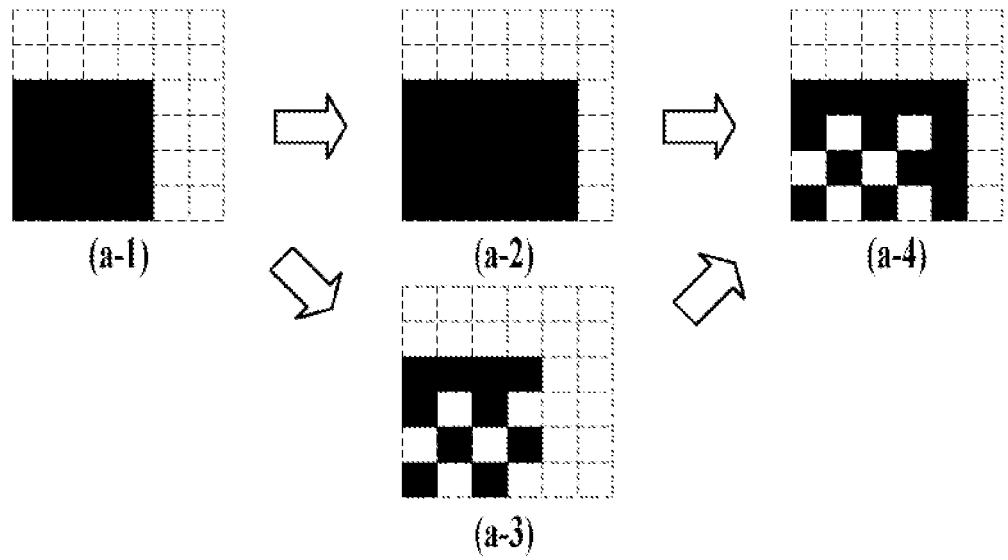
FIGS. 25A and 25B illustrate the comparison between an example of an image change in a case where a horizontal line correction level 1 and a vertical line correction level 0 are selected in the binary image processing unit and an example of an image change in a case where the line width correction/toner save processing setting of this embodiment is not performed in the binary image processing unit.
Figure 25B:
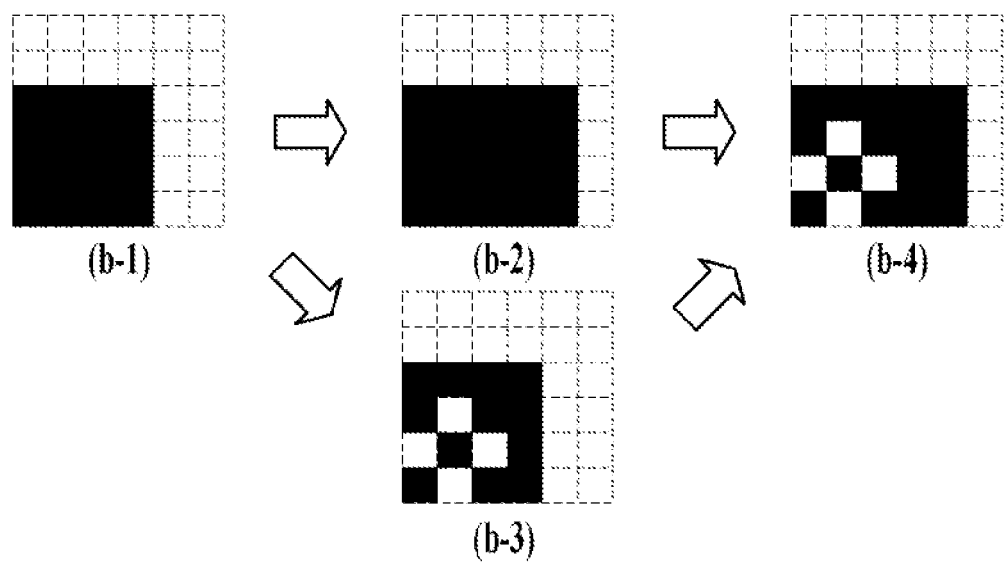

FIGS. 25A and 25B illustrate an example of a change of the image in a case where the horizontal line correction level 1 and the vertical line correction level 0 are selected in FIGS. 24A and 24B. The reference mark (a-1) illustrates an example of the input image inputted to the binary image processing unit 2303. The reference mark (a-1) illustrates only an end position at the upper-right side of the solid region of a certain binary image. Next, the reference mark (a-2) shows an image after the processing by the line width correction processing unit 2340 in the reference mark (a-1). Due to the horizontal line correction level 1, only the right edge is added with 1 pixel in the right direction by the line width correction processing. Next, the reference mark (a-3) illustrates an image after the processing by the toner save processing unit 2330 in the reference mark (a-1). Due to the horizontal line correction level 1, the right edge is not detected in the toner save processing unit 2330 and is subjected to a culling processing. The output images of the tailing suppression processing unit 2350 and the dot dispersion processing unit 2360 are the same as those of the reference mark (a-1) and thus will not be described further. Next, the reference mark (a-4) shoes an example of the output image of the final output determination unit 2370. The reference mark (a-4) shows an output image in which, in a case where the pixel value different from input image (a-1) is included in the reference mark (a-2) or the reference mark (a-3), a different pixel value is selected. Thus, the outer side of the right edge processed by the culling processing in the reference mark (a-3) is given with a plumped pixel in the reference mark (a-2). Thus, the parallel configuration in this embodiment also can realize the image quality similar to the conventional case.

For comparison, the reference marks (b-1) to (b-4) show a case where, the input image of the reference mark (b-1) which is the same as that of the reference mark (a-1) is not subjected to the line width correction/toner save processing setting of this embodiment. According to this example, regardless of the details of the line width correction processing, the image is subjected to the edge detection in all of the upper, lower, left, and right directions in the toner save processing unit 2330. In this case, the input image shown by the reference mark 25 (b-3) after the processing by the toner save processing unit 2330 is an image in which the right edge is also subjected to the edge detection and is not subjected to a culling processing. Based on the image of the reference mark (b-2) after the processing by the line width correction processing unit 2340, the image of the reference mark (b-3), and the input image (b-1), the final output determination unit 2370 generates an output image shown by the reference mark (b-4). Specifically, the right edge of the image is unnaturally highlighted.

As described above, according to this embodiment, the binary image processing unit 2303 having the shared buffer unit 2310 is provided. Furthermore, the edge detection direction of the internal toner save processing and the direction of the line width correction setting are controlled in an exclusive manner. This consequently provides a lower-cost configuration than in the conventional case and provides an image having a quality similar to that of the conventional case.

(Other Embodiments)

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-273673, filed Dec. 14, 2012, which is hereby incorporated by reference herein in its entirety.

What is claimed is:

1. A bicolor image forming apparatus, comprising:
an input unit configured to input into a shared buffer, a bicolor image including a first part of pixels having a first color and a second part of pixels having a second color, the first and second parts being adjacent to each other;
a first image processing unit configured to obtain the input bicolor image from the shared buffer, and convert, on a basis of a first execution condition, the color of at least one pixel included in the first part included in the obtained image from the first color into the second color;
a second image processing unit configured to obtain the input bicolor image from the shared buffer, and convert, on a basis of a second execution condition which is set on a basis of the first execution condition, the color of at least one pixel included in the second part included in the obtained image from the second color into the first color; and
an output unit configured to output another bicolor image having the two colors, on a basis of both a result of the first conversion and a result of the second conversion which are obtained from the first image processing unit and the second image processing unit, respectively.

2. An image forming apparatus, comprising:
a shared buffer unit configured to store an image including an object;
a line width correction processing unit configured to receive the stored image from the shared buffer unit as a first image, wherein the line width correction processing unit includes:
 an edge neighboring detection unit configured to detect an edge neighboring region of the received first image, in at least one specific direction of predetermined directions, the edge neighboring region being outside the object and neighboring a first edge region inside the object of the received first image with respect to the at least one specific direction; and
 a processing unit configured to perform a line width correction processing on the detected edge neighboring region; and
a toner save processing unit configured to receive the stored image from the shared buffer unit as a second image, wherein the toner save processing unit includes:
 an edge detection unit configured to detect a second edge region of the object of the received second image, the second edge region being inside the object of the received second image and corresponding to the first edge region of the first image; and
 a processing unit configured to perform a toner save processing on a part of the detected second edge region.

3. The image forming apparatus according to claim 2, wherein the toner save processing unit and the line width correction processing unit are arranged for parallel processing.

4. The image forming apparatus according to claim 2,
wherein the shared buffer unit is arranged in a former stage of the toner save processing unit and the line width correction processing unit, and
wherein a first pixel group and a second pixel group for a common region of the stored image including a common target pixel are outputted to the line width correction processing unit and the toner save processing unit, respectively.

5. The image forming apparatus according to claim 4, wherein the first and second pixel groups for the common region outputted from the shared buffer unit includes a pixel group referred to by the line width correction processing unit and the toner save processing unit, respectively, in order to obtain a line width correction processing result and a toner save processing result regarding the common target pixel.

6. The image forming apparatus according to claim 5, further comprising a final output determination unit configured to output, in a case where a pixel value of the common target pixel outputted from the shared buffer unit is different from at least one of a pixel value of the common target pixel of the line width correction processing result and a pixel value of the common target pixel of the toner save processing result, a pixel value other than the pixel value of the common target pixel outputted from the shared buffer unit.

7. The image forming apparatus according to claim 6, wherein a pixel value is either a first predetermined value or a second predetermined value.

8. The image forming apparatus according to claim 2, further comprising:
a half tone determination unit configured to determine whether an input image is a half tone image or not, wherein
 the half tone determination unit outputs a common half tone determination result to the toner save processing unit and the line width correction processing unit,
 the line width correction processing unit performs a line width correction processing on an edge neighboring region not determined as a half tone region based on the common half tone determination result, and
 the toner save processing unit performs a toner save processing on an edge region determined as a half tone region based on the common half tone determination result.

9. The image forming apparatus according to claim 8, wherein the shared buffer unit outputs a pixel group for a common region to the half tone determination unit and the pixel group for the common region includes a pixel group that is referred to by the half tone determination unit in order to obtain the common half tone determination result.

10. The image forming apparatus according to claim 4, wherein as in the line width correction processing unit and the toner save processing unit, a dot dispersion processing unit and a tailing suppression processing unit using a pattern matching are also arranged for parallel processing.

11. The image forming apparatus according to claim 10,
wherein the shared buffer unit is arranged in a former stage of the line width correction processing unit, the toner save processing unit, the dot dispersion processing unit, and the tailing suppression processing unit
wherein the first pixel group, the second pixel group, a third pixel group and a fourth pixel group for a common region of the stored image including a common target pixel are outputted to the line width correction processing unit, the toner save processing unit, the dot dispersion processing unit, and the tailing suppression processing unit.

12. The image forming apparatus according to claim 11, wherein the first, second, third and fourth pixel groups for the common region outputted from the shared buffer unit include pixel groups that are referred to by the line width correction processing unit, the toner save processing unit, the dot dispersion processing unit, and the tailing suppression processing unit, respectively, in order to obtain a line width correction processing result, a toner save processing result, a dot dispersion processing result, and a tailing suppression processing result for the common target pixel.

13. The image forming apparatus according to claim 12, further comprising a final output determination unit configured to output, in a case where a pixel value of the common target pixel outputted from the shared buffer unit is different from at least one of a pixel value of the common target pixel of the line width correction processing result, a pixel value of the common target pixel of the toner save processing result, a pixel value of the common target pixel of the dot dispersion processing result, and a pixel value of the common target pixel of the tailing suppression processing result, a pixel value other than the pixel value of the common target pixel outputted from the shared buffer unit.

14. The image forming apparatus according to claim 13, wherein a pixel value is either a first predetermined value or a second predetermined value.

15. The image forming apparatus according to claim 3, further comprising a direction setting unit configured to set the at least one specific direction based on a line width correction setting by a user.

16. The image forming apparatus according to claim 3, wherein the processing unit of the toner save processing unit performs the toner save processing based on a logical operation with a toner save pattern.

17. The image forming apparatus according to claim 3, wherein the processing unit of the line width correction processing unit performs the line width correction processing by converting white pixels of a edge neighboring region to black pixels.

18. The image forming apparatus according to claim 2,
wherein the edge detection unit of the toner save processing unit determines non-edge region which is inside the object and other than edge region of the object of the received second image, and
wherein the processing unit of the toner save processing unit performs the toner save processing on a part of the determined non-edge region in addition to the part of the detected second edge region.

19. The image forming apparatus according to claim 2, wherein the processing unit of the line width correction processing unit performs the line width correction processing by converting a color of the detected edge neighboring region to a color of the object of the received first image.

20. The image forming apparatus according to claim 19,
wherein the stored image is a bicolor image having a white color and a black color,
wherein the color of the object of the received first image is the black color, and
wherein the color of the detected edge neighboring region is the white color.

21. The image forming apparatus according to claim 2, wherein the processing unit of the toner save processing unit performs the toner save processing by converting a color of the part of the detected second edge region to another color.

22. The image forming apparatus according to claim 21,
wherein the stored image is a bicolor image having a white color and a black color,
wherein the color of the detected second edge region is the black color, and
wherein the another color is the white color.

23. The image forming apparatus according to claim 22,
wherein the part of the second edge region is determined by matching between the second edge region and a pattern for toner save.

24. An image forming method, comprising:
a storing step of storing an image including an object in a shared buffer;
a line width correction process step which receives the stored image from the shared buffer as a first image, wherein the line width correction processing step includes:
an edge neighboring detection step of detecting an edge neighboring region of the received first image, in at least one specific direction of predetermined directions the edge neighboring region being outside the object and neighboring a first edge region inside the object of the received first image with respect to the at least one specific direction; and
a processing step of performing a line width correction processing on the detected edge neighboring region; and
a toner save processing step which receives the stored image from the shared buffer as a second image, wherein the toner save processing step includes:
an edge detection step of detecting a second edge region of the object of the received second image, the second edge region being inside the object of the received second image and corresponding to the first edge region of the first image; and
a processing step of performing a toner save processing on a part of the detected second edge region.

25. A non-transitory computer readable storage medium storing a program for causing a computer to function as the image forming apparatus according to claim 2.

26. An image processing apparatus comprising:
a shared buffer configured to store an image including at least one part of an object;
a first image processing unit configured to receive the stored image from the shared buffer as a first image, and perform on the received first image, a first image process of transforming a shape of the at least one part of the object in the received first image;
a second image processing unit configured to receive the stored image from the shared buffer as a second image, and perform on the received second image, a second image process of correcting, on a basis of a shape of the at least one part of the object in the received second image and information corresponding to a behavior of the transformation, the at least one part of the object in the received second image so that the correction corresponds with the behavior of the transformation; and
an output unit configured to receive a result of the first image process and a result of the second image process from the first image processing unit and the second image processing unit, respectively, and output another image on a basis of the received both results.

27. The image processing apparatus according to claim 26, wherein the correction in the second image process is performed in accordance with a rule of the behavior of the transformation.

28. The image processing apparatus according to claim 26, wherein the first image processing unit, in the first image process, transforms the shape of the at least one part of the object in the received first image on a basis of information used for determining the behavior of the transformation.

29. The image processing apparatus according to claim 26,
wherein, in the transformation, the first image processing unit shifts in a specific direction, a position of an edge of the at least one part of the object in the received first image,
wherein, the information is relative to the specific direction, and
wherein, in the correction, the second image processing unit determines at least one region of a plurality of regions of edges of the at least one part of the object in the received second image, on a basis of the shape of the at least one part of the object in the received second image and the information, and performs a specific process on the determined at least one region in the received second image.

30. The image processing apparatus according to claim 26, wherein the first image processing unit and the second image processing unit are arranged for parallel processing.

31. The image processing apparatus according to claim 26, wherein the second image processing unit further determines one or more regions of the plurality of the regions other than the at least one region, and does not perform the specific process on the determined one or more regions in the received second image.

32. The image processing apparatus according to claim 26, wherein the transformation by the first image processing unit is performed by enlarging the at least one part of the object in the received first image.

33. The image processing apparatus according to claim 32, wherein the enlargement is performed by enlarging in a specific direction, the at least one part of the object in the received first image.

34. The image processing apparatus according to claim 33, wherein the enlargement is performed by changing a color of at least one pixel to a color of the object, the at least one pixel being outside the at least one part of the object and adjacent to the edge of the at least one part of the object in the received first image with respect to the specific direction.

35. The image processing apparatus according to claim 26, further comprising:
a control unit configured to control the second image processing unit by providing the information.

36. The image processing apparatus according to claim 29, wherein the second image processing unit further determines a region, which is inside the at least one part of the object, of non-edge of the object in the received second image, and performs the specific process on the region of the non-edge in the received second image.

37. The image processing apparatus according to claim 29, wherein the specific process performed on a focused region includes:
specifying at least one pixel in the focused region using a predetermined pattern; and
thinning the specified at least one pixel in the received second image.

38. The image processing apparatus according to claim 37, wherein the thinning is performed by changing a color of the specified at least one pixel to a color of a background of the at least one part of the object in the received second image.

39. The image processing apparatus according to claim 26, wherein the image is a bicolor image having a first color and a second color, the at least one part is represented by the first color, and a background of the at least one part is represented by the second color.

40. An image processing apparatus comprising:
a shared buffer configured to store an image including a focused pixel;
an image processing unit configured to obtain the stored image and to perform an image process on the obtained image to obtain a first focused pixel on which the image process has been performed; and
an output unit configured to obtain a second focused pixel on which the image process has not been performed from the shared buffer, obtain the first focused pixel on which the image process has been performed from the image processing unit, and output a pixel for the focused pixel on the basis of whether or not the two obtained focused pixels are equivalent,
wherein the output unit outputs a pixel equivalent to the second focused pixel obtained from the shared buffer if the two obtained focused pixels are equivalent, and outputs a pixel equivalent to the first focused pixel obtained from the image processing unit if the two obtained focused pixels are not equivalent.

41. The image processing apparatus according to claim 40, further comprising:
another image processing unit configured to obtain the stored image and to perform another image process on the obtained image to obtain a third focused pixel on which the another image process has been performed,
wherein the output unit further obtains the third focused pixel on which the another image process has been performed from the another image processing unit, and outputs a pixel for the focused pixel on the basis of a result of comparison among the three obtained focused pixels, and
wherein the output unit outputs a pixel equivalent to the second focused pixel obtained from the shared buffer if the three obtained focused pixels are equivalent, outputs a pixel equivalent to the first focused pixel obtained from the image processing unit if the first focused pixel obtained from the image processing unit is not equivalent to the other two obtained focused pixels which are equivalent, and outputs a pixel equivalent to the third focused pixel obtained from the another image processing unit if the third focused pixel obtained from the another image processing unit is not equivalent to the other two obtained focused pixels which are equivalent.

42. The image processing apparatus according to claim 41, wherein the image processing unit and the another image processing unit are operable in parallel.

43. The image processing apparatus according to claim 41, wherein the image processing unit is a line width correction processing unit configured to perform on the first obtained image, a line width correction process for making a line included in the stored image thick, and
wherein the another image processing unit is a toner save processing unit configured to perform on the second obtained image, a toner save processing for reducing an amount of toner to be used for visualization based on the stored image.

44. The image processing apparatus according to claim 41, wherein the another image processing unit performs, on the obtained image, the another image process corresponding with the image process which is performed by the image processing unit.

45. The image processing apparatus according to claim 44, further comprising:
a setting unit configured to set up the image processing unit and the another image processing unit on a basis of setting information.

* * * * *